United States Patent
Acharya et al.

(10) Patent No.: US 12,034,475 B2
(45) Date of Patent: Jul. 9, 2024

(54) SYSTEM AND METHOD FOR AUTOMATED IDENTIFICATION OF FIBER CAPACITY

(71) Applicant: JIO PLATFORMS LIMITED, Ahmedabad (IN)

(72) Inventors: Harshad Vasudeo Acharya, Mumbai (IN); Chandrasekhar S. Reddy, Thane (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 196 days.

(21) Appl. No.: 17/649,485

(22) Filed: Jan. 31, 2022

(65) Prior Publication Data

US 2022/0247489 A1     Aug. 4, 2022

(30) Foreign Application Priority Data

Jan. 29, 2021   (IN) .............................. 202121004048

(51) Int. Cl.
| | | |
|---|---|---|
| *H04B 10/07* | (2013.01) | |
| *H04B 10/071* | (2013.01) | |
| *H04B 10/077* | (2013.01) | |
| *H04B 10/079* | (2013.01) | |
| *H04Q 11/00* | (2006.01) | |

(52) U.S. Cl.
CPC .......... *H04B 10/071* (2013.01); *H04B 10/07* (2013.01); *H04B 10/0773* (2013.01); *H04B 10/0793* (2013.01); *H04Q 11/0062* (2013.01); *H04Q 2011/0079* (2013.01); *H04Q 2011/0083* (2013.01)

(58) Field of Classification Search
CPC .. H04B 10/071; H04B 10/07; H04B 10/0773; H04B 10/0793; G02B 6/4454; G02B 6/4482; H04Q 11/0062; H04Q 2011/0079; H04Q 2011/0083
USPC ......................................... 398/9–38, 43–103
See application file for complete search history.

(56) References Cited

U.S. PATENT DOCUMENTS

| | | | |
|---|---|---|---|
| 6,222,975 B1 * | 4/2001 | Gilbert ................. | G02B 6/4452 385/134 |
| 6,792,174 B1 * | 9/2004 | Ramaswami ....... | H04J 14/0297 385/24 |
| 7,023,806 B1 * | 4/2006 | Gunluk .................. | H04L 45/12 370/254 |

(Continued)

*Primary Examiner* — Dibson J Sanchez
(74) *Attorney, Agent, or Firm* — FINNEGAN, HENDERSON, FARABOW, GARRETT & DUNNER, LLP

(57) ABSTRACT

The present disclosure provides automated solution for identification of spare fiber capacity with minimal manual intervention thereby eliminating the errors and ensure reliability and scalability and implemented by independent modules to provide Tabular, Schematic and Map view available for depicting route-side fiber capacity (total/used/unused). The method includes automatically enrichment of logical links data discovered by EMS/NMS systems which provide the logical paths/links between two equipment with port details along with host name of the equipment and identifier of the port. The method further includes, enriching the EMS/NMS links data, based on host name and inventory mapping, within logical network inventory management system thereby resulting in the availability of links inventory data in 'From site-from equipment-rom port' and 'to site-to equipment-to port' format.

17 Claims, 15 Drawing Sheets

(56) References Cited

U.S. PATENT DOCUMENTS

| | | | | |
|---|---|---|---|---|
| 7,453,824 | B1* | 11/2008 | Nucci | H04J 14/0241 |
| | | | | 398/43 |
| 7,543,328 | B2* | 6/2009 | Bialk | H04L 41/22 |
| | | | | 725/129 |
| 10,707,958 | B2* | 7/2020 | Searcy | H04B 10/564 |
| 2003/0011846 | A1* | 1/2003 | Gholamhosseini | H04L 41/145 |
| | | | | 398/98 |
| 2009/0263124 | A1* | 10/2009 | Akyamac | H04J 14/0284 |
| | | | | 398/17 |
| 2011/0085469 | A1* | 4/2011 | Klincewicz | H04L 45/125 |
| | | | | 370/254 |
| 2011/0129222 | A1* | 6/2011 | Karol | H04J 14/0269 |
| | | | | 398/58 |
| 2012/0054343 | A1* | 3/2012 | Sticker | H04L 43/0805 |
| | | | | 709/225 |
| 2013/0028594 | A1* | 1/2013 | Li | H04L 41/12 |
| | | | | 398/25 |
| 2019/0014036 | A1* | 1/2019 | Anand | G06F 16/2477 |
| 2019/0260468 | A1* | 8/2019 | Xu | H04B 10/0771 |
| 2020/0124498 | A1* | 4/2020 | Leclerc | G01M 11/333 |
| 2020/0274620 | A1* | 8/2020 | Nykolak | H04B 10/67 |
| 2021/0013961 | A1* | 1/2021 | Manning | H04L 69/324 |
| 2023/0013049 | A1* | 1/2023 | Luo | G01M 11/3136 |

* cited by examiner

SYSTEM AND METHOD FOR AUTOMATED IDENTIFICATION OF FIBER CAPACITY

TECHNICAL FIELD

The present disclosure relates to communication system and more particularly to automated identification of total/used/unused fiber capacity between two locations on optical fiber network by overlaying logical links data discovered on the physical cable data captured in physical inventory management system.

BACKGROUND

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Today with the advent of wireline technology like optical fiber and wireless technology like OSM, EDGE, HSPA, LTE, and the like, all communications in a wireline and wireless network provide various communication services such as voice, video, data, advertisement, content, messaging, broadcasts, etc.

One example of advanced wired network is the Optical fiber for high-speed communications. An Optical fiber cable, is an assembly of an electrical cable containing one or more optical Fibers that are used to carry light for communication signals. The Optical Fiber elements are typically individually coated with plastic layers in a protective tube suitable for any environment where the cable will be deployed. Different types of Optical Fibers are used for different applications, for example, long distance telecommunication, or providing a high-speed data connection between different parts of a building. There are hybrid optical and electrical cables that are used in wireless outdoor Fiber to the Antenna applications. In these cables, the Optical Fibers carry information, and the electrical conductors are used to transmit power. These cables can be placed in several environments to serve antennas mounted on poles, towers, and other structures. These types of hybrid cables may also be useful in other environments such as Distributed Antenna System (DAS) where they will serve antennas in indoor, outdoor, and roof-top locations.

The use of optical Fiber for communications purposes continues to grow. Data, voice, and other communication networks are increasingly using Optical fiber to carry information. In an Optical fiber network, each individual Fiber is generally connected to both a source and a destination device. An optical Fiber comprises a core, a cladding surrounding the core and a jacket surrounding the cladding wherein the core is offset from the centre of the optical Fiber. As the skilled person will appreciate, an optical Fiber comprises a core, which is optically transmissive at the wavelength of operation, surrounded by cladding material which has a different refractive index to the core, the core and cladding together co-operating to guide optical radiation within the core of the Fiber. The cladding is generally surrounded by a jacket material to protect the optical Fiber. The jacket may include a buffer material between the cladding and the outer jacket Standard optical Fibers have the core in the centre of the Fiber and are generally symmetrical in section, within manufacturing tolerances.

As shown in FIG. 1, a telecommunication network is established by connecting telecom equipment installed at various network site locations using optical fiber cables. The cables contain multiple fiber strands which carry the voice, video and data signals in the form of light. The optical fiber cables are joined at spice locations in either straight manner or a branch-off manner. One optical fiber cable contains multiple fiber strands (e.g. 6/12/24/48/96/144/288).

In 5G cellular deployment wired such as Optical fiber and wireless technology, such as macro cells, along with various small cells, are planned to provide coverage and capacity solution across the target area with both the use of wireless technology and wireline technology. Currently, network planning is a long-drawn activity involving thousands of man-hours from highly skilled telecom planning engineers, taking months to perform. The Planning and deployment is a long-drawn and tedious activity, involving 1000 of engineers working over months, breaking up and analyzing large datasets individually before finally devising a plan for both wired and wireless deployment.

In any Service Operator's OFC network, them are a lot of unused/free fiber strands across the network which are neither connected to the telecom equipment for carrying the traffic nor connected to fiber monitoring system nor leased out to another telecom service provider. Any Service Operator would want to know the inventory and monetize the fiber assets by leasing out the cable or individual fiber strands to other telecom operators/service providers.

At present, there is no tool available to identify the used/unused fiber capacity between two locations of the OFC network. The manual method of updating the connections between Equipment, fiber distribution panel (FDP). Fiber and splice closures to extract the report of available fiber capacity (in terms of fiber strands) is entirely human-dependent, manual and hence error-prone. The output cannot be relied upon and requires site-survey/field-survey. Considering the number of sites and length of OFC in Operator network, the fields survey is not feasible option.

The above existing approaches of updating connections between Optical fiber over an area is entirely human-dependent, manual and hence error-prone and therefore the outcome of the updation of the Optical fiber is not fully complete. There are currently several challenges in the existing system which are listed as follows:

There is no solution available that provides automated solution for identification of spare fiber capacity with minimal manual intervention thereby eliminating the errors, Them is no solution available that provides implementation in a pipelined manner to ensure reliability and scalability and implemented by independent modules.

There is no solution available that provides Tabular, Schematic and Map view available for depicting route-side fiber capacity (total/used/unused), There is no solution available that will have no requirement of field survey/site visit for physical verification or data collection.

Them is no solution available that provides planning approach where various option of configuration that are available for Optical fiber solutions with no manual interventions.

There is no solution available that provides planning approach for both wired, and wireless such as macro and outdoor small cells solution for next generation telecom network.

There is no solution available that can also be used by NPE (Network Planning and Engineering) to assess the feasibility of delivering the customer order for leasing the fibers without any need of site visit/field survey.

There is therefore a need for an advancement in planning of the next generation network which complements an existing telecom deployment to achieve automated solution for identification of spare fiber capacity with minimal manual intervention thereby eliminating the errors in a heterogeneous network.

This disclosure proposes the planning of the next generation network which complements an existing telecom deployment to achieve automated solution for identification of spare fiber capacity with minimal manual intervention thereby eliminating the errors in a heterogeneous network.

Objects of the Present Disclosure

Some of the objects of the present disclosure aimed to ameliorate one or more problems of the prior art or to at least provide a useful alternative are listed herein below:

It is an object of the present disclosure to provide a system and method that facilitates an output that is directly usable in establishing the feasibility of customer orders for leasing out the fiber strands/fiber cables in service operator's OFC network.

It is an object of the present disclosure to provide a system and method that facilitates a schematic representation of the OFC network that depicts used/available fibers between any two locations which is helpful for OSP NOC and OandM.

It is an object of the present disclosure to provide a system and method that facilitates helping Network Planning and Engineering (NPE) teams to identify the nearest location (site or chamber) to the customer location from where fiber tap-off can be taken.

It is an object of the present disclosure to provide system and method that facilitates rendering on GIS map for spatial analysis in addition to the tabular and schematic representation.

It is an object of the present disclosure to provide a system and method to minimize, almost eliminate, the need of field survey and site visits for verification and collection of data thereby rendering the cost benefit to the organization.

It is an object of the present disclosure to provide a system and method that overlays the logical links/paths data to discover by EMSs/NMSs over OFC network to capture in physical inventory management system to identify the used fiber capacity and available/spare fiber capacity between any two locations on OFC network.

It is an object of the present disclosure to provide a system and method that facilitates the integration of EMS/NMS with physical inventory management system and logical inventory management system to improve the quality of as-built data of physical network which cannot be 'discovered' from the network.

It is an object of the present disclosure to provide a system and method that facilitates identification of spare fiber capacity with minimal manual intervention thereby eliminating the errors.

It is an object of the present disclosure to provide a system and method that facilitates implementation in a pipelined manner to ensure reliability and scalability and implemented by independent modules.

It is an object of the present disclosure to provide a system and method that facilitates Tabular. Schematic and Map view available for depicting route-side fiber capacity (total/used/unused).

It is an object of the present disclosure to provide a system and method that facilitates no requirement of field survey/site visit for physical verification or data collection.

It is an object of the present disclosure to provide a system and method that facilitates a planning approach where various option of configuration that am available for Optical fiber solutions with no manual interventions.

Itis an object of the present disclosure to provide a system and method that facilitates a planning approach for both wired, and wireless such as macro and outdoor small cells solution for next generation telecom network.

It is an object of the present disclosure to provide a system and method that facilitates NPE to assess the feasibility of delivering the customer order for leasing the fibers without any need of site visit/field survey.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components.

SUMMARY

Figure 1:
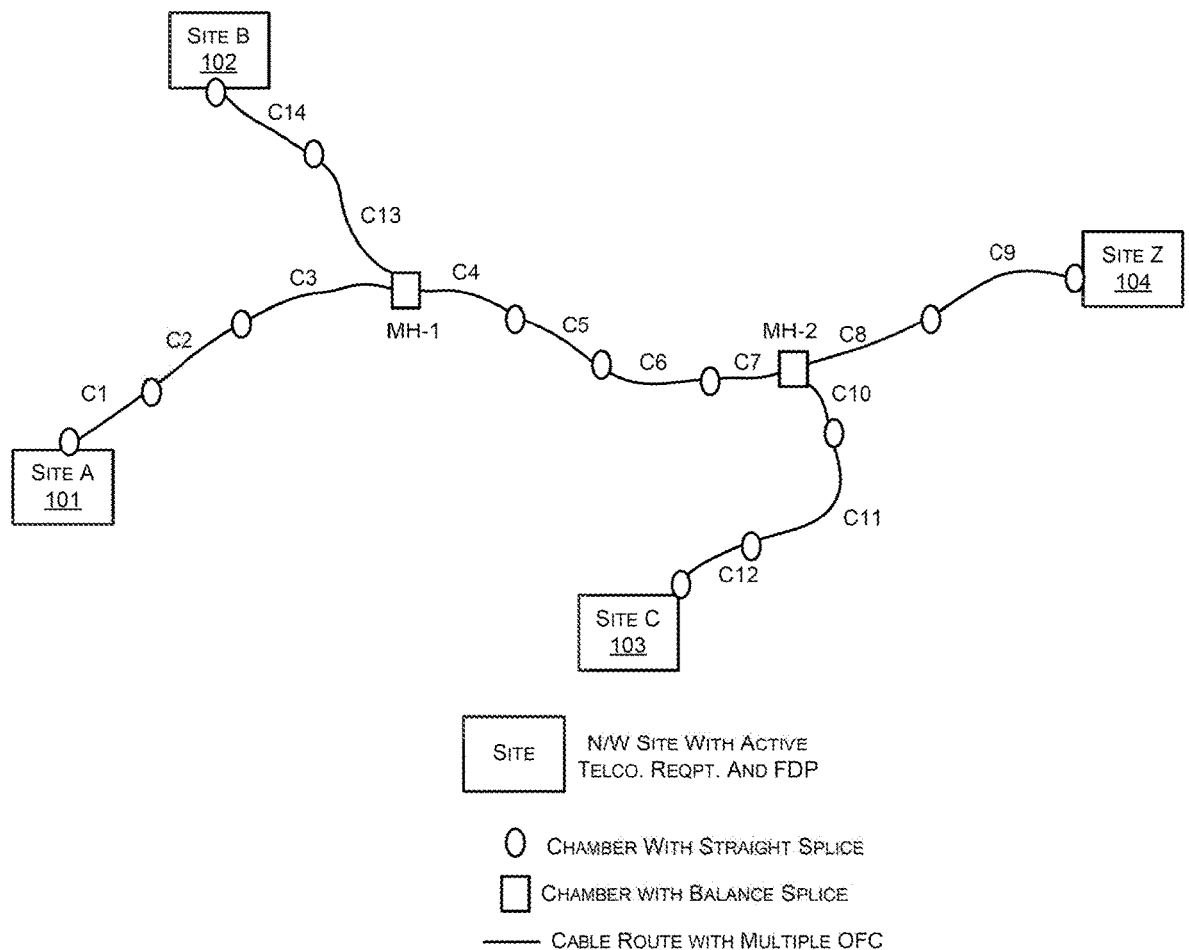
FIG. 1 illustrate existing Typical optical Fiber cable network in accordance with an embodiment of the present disclosure.

This section is provided to introduce certain objects and aspects of the present disclosure in a simplified form that are further described below in the detailed description. This summary is not intended to identify the key features or the scope of the claimed subject matter.

In an aspect, the present disclosure provides fora system facilitating identification of fiber capacity. The system may include a network of optical fiber cabling arrangement between a plurality of telecom equipments, comprising a multi-fiber OFC, and each telecom equipment may be connected to a Fiber Distribution Panel (FDP) with a patch cord, and the patch cord may connect a port of a telecom equipment to the FDP. The system may further include a management module coupled to a capacity utilization pipeline system (CUPS) module, the management module comprising a processor that executes a set of executable instructions that are stored in a memory, upon execution of which, the processor causes the system to: discover the logical network paths riding on the network of optical fiber cabling arrangement between an end to end connectivity, the end to end connectivity corresponding to an equipment-port of a first telecom equipment to an equipment-pot of a second telecom equipment; scan, by a logical inventory module, a logical link path between the end to end connectivity; trace, by a physical inventory module, an end to end physical connectivity between the end to end connectivity; identify a set of features of the optical fiber cable (OFC) based on the scanning and tracing of the ORC between the end to end connectivity; and determine the capacity of the OFC based on the identification of the set of feature, the set of features corresponding to lit, unlit, used and unused fiber strands in the OFC.

In an embodiment, a plurality of chambers in the network of optical fiber cabling arrangement chamber may include a plurality of fiber splice closure, each fiber splice closure may further include one or more splitters connecting a plurality of OFC at a junction.

In an embodiment, the capacity utilization pipeline system (CUPS) module may be configured to identify the nearest location to the subscriber location for providing fiber tap-off.

In an embodiment, a geographical information system (GIS) mapping for spatial analysis, tabular and schematic representation for depicting mute-side fiber capacity may be performed.

In an embodiment, the system may enable verification and collection of data corresponding to fiber capacity.

In an embodiment, an error correction module may eliminate error during verification and collection of data corresponding to fiber capacity.

In an embodiment, logical link data discovered by the management module may provide the logical paths/links between two equipment with port details along with host name of the equipment and Identifier of the port.

In an embodiment, the CUPS may further include an equipment inventory identikit configured to: determine availability of an end-to-end connectivity in the network of optical fiber cabling arrangement between a plurality of user equipments; trace the end-to-end connectivity in the network of optical fiber cabling arrangement between a plurality of user equipments; and determine whether the end-to-end connectivity is present as per predefined logical links.

In an embodiment, the CUPS may be further configured to: generate a first exception report, if the end-to-end connectivity is not present; assign fibers for fiber usage determined in the trace path of the end to end connectivity, if an Out Side Plant (OSP) connectivity is present in the network of optical fiber cabling arrangement between a plurality of user equipments; publish a second exception report, the second exception report corresponding to a missing connectivity between an active telecom equipment to a Fiber Distribution Panel (FDP); generate a list of participating fibers in the trace path between the active telecom equipment to the Fiber Distribution Panel (FDP); and assign fiber usage and status at fiber level to the list of participating fibers in the trace path between the active telecom equipment to the Fiber Distribution Panel (FDP).

In an embodiment, the data corresponding to the logical inventory module may be stored and updated based on host name and inventory mapping in 'From site-from equipment-from port' and 'to site-to equipment-to port' format.

In an aspect, the present disclosure provides for a method facilitating identification of fiber capacity. The method may include the steps of discovering, by a management module coupled to a capacity utilization pipeline method (CUPS) module, a network of optical fiber cabling arrangement between an end to end connectivity, the end to end connectivity corresponding to an equipment-port of a first telecom equipment to an equipment-port of a second telecom equipment; scanning, by a logical inventory module, a logical link path between the end to end connectivity; tracing, by a physical inventory module, an end to end physical connectivity between the end to end connectivity; identifying a set of features of the optical fiber cable (OFC) based on the scanning and tracing of the OFC between the end to end connectivity; and determining the capacity of the OFC based on the identification of the set of feature, the set of features corresponding to lit, unlit, used and unused fiber strands in the OFC.

DETAILED DESCRIPTION

In the following description, for the purposes of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address any of the problems discussed above or might address only some of the problems discussed above. Some of the problems discussed above might not be fully addressed by any of the features described hemin. Example embodiments of the present invention are described below, as illustrated in various drawings in which like reference numerals refer to the same parts throughout the different drawings.

In an aspect, the present disclosure relates proposes the planning of the next generation network which complements an existing telecom deployment to achieve automated solution for identification of spare Fiber capacity with minimal manual intervention thereby eliminating the errors in a heterogeneous network.

Embodiments of the present disclosure may relate to a method of planning of the next generation network which complements an existing telecom deployment to achieve automated solution for identification of spare fiber capacity with minimal manual intervention thereby eliminating the errors in a heterogeneous network. The method automatically includes enrichment of logical links data discovered by Element Management System (EMS)/Network Management System (NMS) systems which provide the logical paths/links between two equipment with port details along with host name of the equipment and identifier of the port. The method further includes, enriching the EMS/NMS links data, based on host name and inventory mapping, within logical network inventory management system thereby resulting in the availability of links inventory data in 'From site-from equipment-from port' and 'to site-to equipment-to port' format.

Further, the embodiments of the present disclosure may relate to the planning of a radio network and includes various sub elements, wherein, the method includes CUPS to check availability of end-to-end connectivity in GIS-based physical network inventory management system using equipment inventory identifier, trace the connectivity in the physical inventory system and check whether end-to-end connectivity is present as per the logical links or not. Further, the method checks, if end-to-end ('from-equipment-port' to 'to-equipment-port) connectivity is not present in the physical network inventory management system, then CUPS will generate exception report. Also, further the method includes, if the Out Side Plant (OSP) connectivity is present in the physical inventory system between the equipment of 'A' and 'Z' site, then the CUPS will get the participated-cables in the trace path and assign fiber usage in CUPS and publish exception report of missing in Side Plant (ISP) connectivity i.e. connectivity between active telecom equipment to Fiber Distribution Panel (FDP). Also, further the method includes, if the end-to-end link is available in the physical inventory system, then get the list of participating Fiber by CUPS in the trace path and assign the fiber usage as well as the status at fiber level by CUPS.

In an aspect, FIG. 1 illustrates a typical Out Side Plant (OSP) view of the optical Fiber cable network mute to connect various nodes of communication nodes according to various aspects of the Invention. As shown in the figure, a conventional communication network is established by connecting communication equipment installed at various network sites A (101), B (102), C (103) and Z (104) locations using optical fiber cables.

Figure 2:
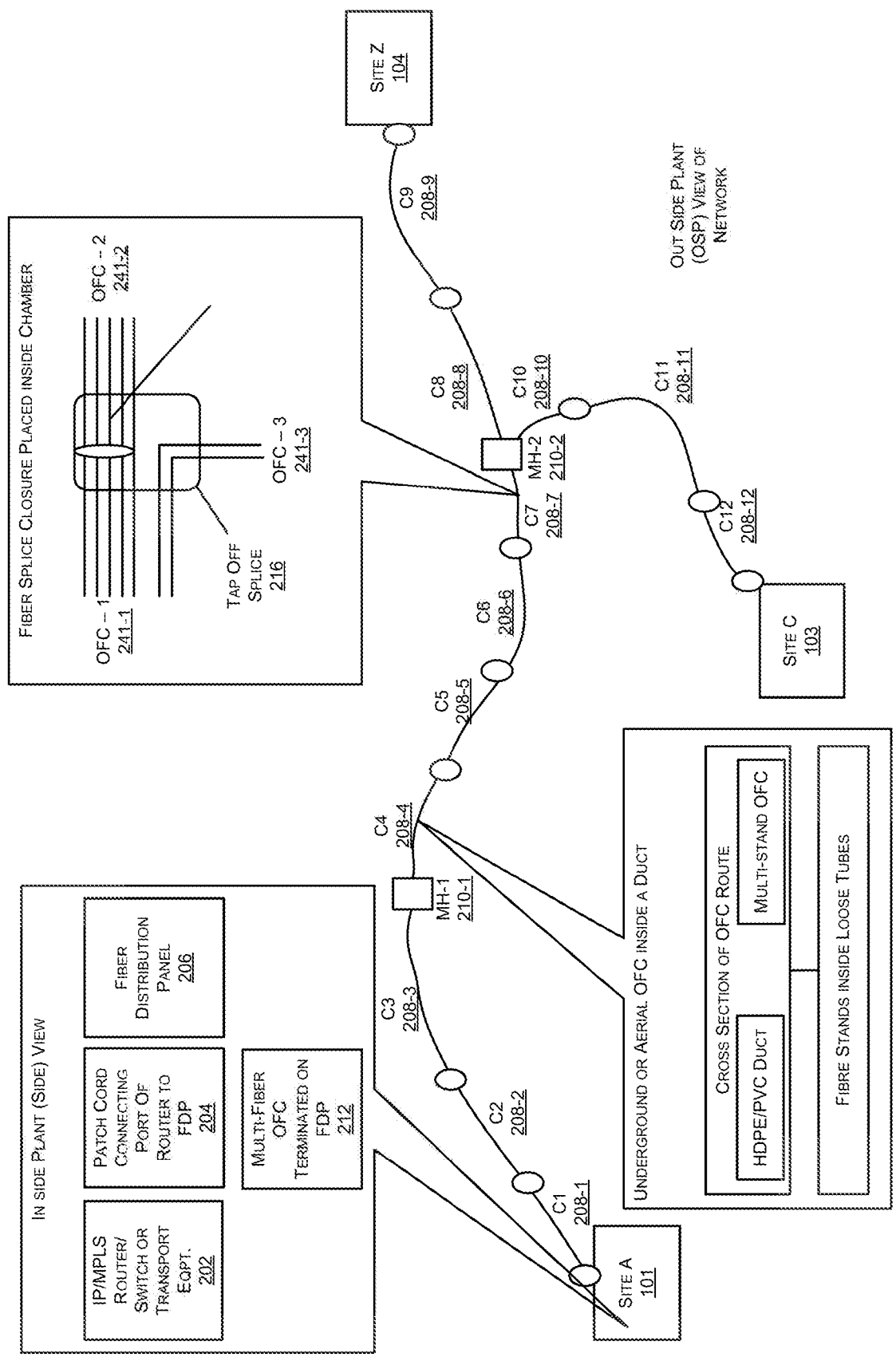
FIG. 2 illustrates various inventory components in the optical fiber network in accordance with an embodiment of the present disclosure.

FIG. 2 illustrates the details of the optical Fiber cable network nodes in optical fiber ecosystem according to various aspects of the Invention. The sites (101, 102, 103, 104) nodes are connected with a plurality of chambers with straight splice C1 . . . . C12 (208-1, 208-2 . . . 208-12) and through the chambers with branched splices MH1 (210-1) and MH2 (210-2). The sites may be active network sites with active communication equipment (also referred to as telecom equipment or user equipment) and Fiber distribution panel (FDP). A management module operatively coupled to the communication equipment may include Elemental Management System (EMS) or Network Management System (NMS) Data may provide the logical links/paths discovered from the network for different site nodes. The cables contain multiple fiber strands which carry the voice, video and data signals in the form of light. The optical fiber cables are joined at spice locations in either straight manner or a branch-off manner. One optical fiber cable may contain multiple fiber strands (e.g. 6/12/24/48/96/144/288).

The In Slide Plant (ISP) site view consist of IP/MPLS Router/switch or Transport equipment (202) connected to the FDP (206) with a patch cord (204) connecting a port of router to the FDP wherein the FDP may be connected to Multi-Fiber OFC (212) terminated on an FDP. The underground or aerial OFC (208-4) inside the duct consist of Fiber strands inside loose tubes with cross section view of OFC as HDPE/PVC Duct and Multi-strand OFC. The Fiber Splice closure (208-7) placed inside a chamber consists of splices or joints connecting OFC 1 (214-1) to OFC 2 (214-2) and OFC 3 (214-3) at the junction of straight through splice at the tap off splice (216). The management module may be further coupled to a capacity utilization pipeline system (CUPS) module, and the management module may include a processor that executes a set of executable instructions that an stored in a memory, upon execution of which, the processor causes the system to discover the logical network paths riding on a network of optical fiber cabling arrangement between an end-to-end connectivity. The end to end connectivity may correspond to an equipment-port of a first telecom equipment to an equipment-port of a second telecom equipment, scan, by a logical inventory module, a logical link path between the end to end connectivity, trace, by a physical inventory module, an end to end physical connectivity between the end to end connectivity, identify a set of features of the optical fiber cable (OFC) based on the scanning and tracing of the OFC between the end to end connectivity and determine the capacity of the OFC based on the identification of the set of features corresponding to lit, unlit, used and unused fiber strands in the OFC.

In an embodiment, the capacity utilization pipeline system (CUPS) module may be configured to identify the nearest location to the subscriber location for providing fiber tap-off A geographical information system (GIS) mapping for spatial analysis, tabular and schematic representation for depicting route-side fiber capacity may be performed by the system.

The system (200) may further enable verification and collection of data corresponding to fiber capacity and an error correction module may eliminate errors during verification and collection of data corresponding to fiber capacity.

In an embodiment, a logical link data may be discovered by the management module provide the logical paths/links between two equipment with port details along with host name of the equipment and identifier of the port.

In an embodiment, the CUPS may further include an equipment inventory identifier that may be configured to; determine availability of an end-to-end connectivity in the network of optical fiber cabling arrangement between a plurality of user equipments, trace the end-to-end connectivity in the network of optical fiber cabling arrangement between a plurality of user equipments, and determine whether the end-to-end connectivity is present as per predefined logical links.

In an embodiment, the CUPS may further be configured to: generate a first exception report, if the end-to-end connectivity is not present, assign fibers for fiber usage determined in the trace path of the end to end connectivity, if an Out Side Plant (OSP) connectivity is present in the network of optical fiber cabling arrangement between a plurality of user equipments, publish a second exception report, said second exception report corresponding to a missing connectivity between an active telecom equipment to an FDP, generate a list of participating fibers in the trace path between the active telecom equipment to the FDP; and assign fiber usage and status at fiber level to the list of participating fibers in the trace path between the active telecom equipment to the Fiber Distribution Panel (FDP).

Figure 3:
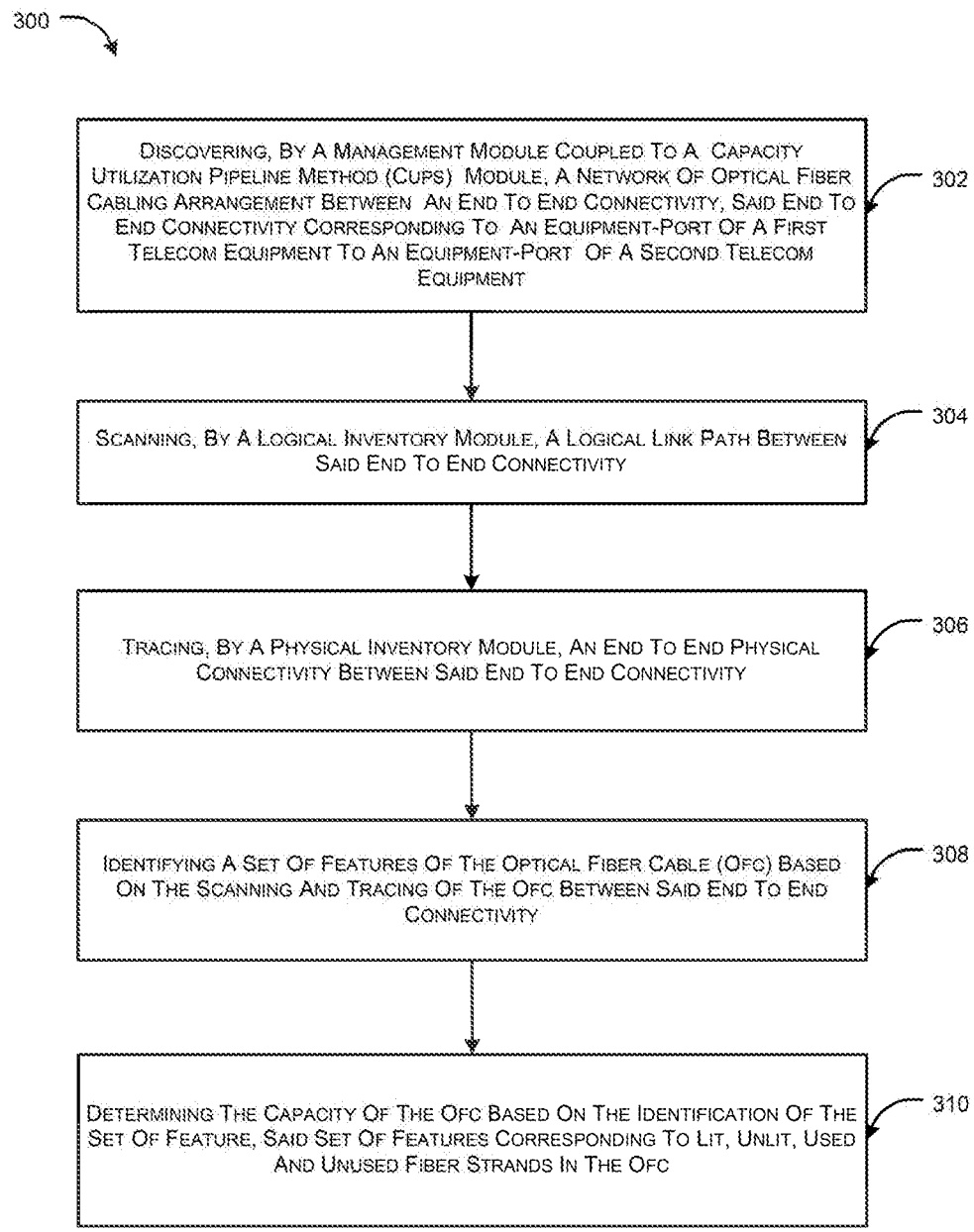
FIG. 3 illustrates an exemplary flow diagram of the proposed method in accordance with an embodiment of the present disclosure.

FIG. 3 illustrates an exemplary flow diagram of the proposed method (300) in accordance with an embodiment of the present disclosure.

As illustrates, in an aspect, the present disclosure provides for a method (300) facilitating identification of fiber capacity. The method may include the step at 302 of discovering, by a management module coupled to a capacity utilization pipeline method (CUPS) module, a network of optical fiber cabling arrangement between an end to end connectivity, the end to end connectivity corresponding to an equipment-port of a first telecom equipment to an equipment-port of a second telecom equipment and at step 304, scanning, by a logical inventory module, a logical link path between the end to end connectivity. The method (300) may further include the step 306 of tracing, by a physical inventory module, an end-to-end physical connectivity between the end-to-end connectivity and at step 308, identifying a set of features of the optical fiber cable (OFC) based on the scanning and tracing of the OFC between the end to end connectivity. Furthermore, the method (300) may include the step 310 of determining the capacity of the OFC based on the identification of the set of features, the set of features corresponding to lit, unlit, used and unused fiber strands in the OFC.

In an embodiment, the method may further include a step of identifying by a capacity utilization pipeline system (CUPS) module a nearest location to the subscriber location for providing fiber tap-off.

In an embodiment, the method may further include a step of mapping geographical information system (GIS) for spatial analysis, tabular and schematic representation for depicting route-side fiber capacity.

In an embodiment, the method may further include a step of enabling verification and collection of data corresponding to fiber capacity.

In an embodiment, the method may further include a step of eliminating by an error correction module, errors during verification and collection of data corresponding to fiber capacity.

In an embodiment, the method may further include a step of providing logical links between two equipment with port details along with host name of the equipment and identifier of the port corresponding to logical link data discovered by the management module.

In an embodiment, the method may further include the steps of determining, by an equipment inventory identifier coupled to the CUPS, availability of an end-to-end connectivity in the network of optical fiber cabling arrangement between a plurality of user equipments; tracing, by the equipment inventory identifier, the end to end connectivity in the network of optical fiber cabling arrangement between a plurality of user equipments; and determining, by an equipment inventory identifier, whether the end-to-end connectivity is present as per predefined logical links.

In an embodiment, the method may further include the steps of generating a first exception report, if the end-to-end connectivity is not present; assigning fibers for fiber usage determined in the trace path of the end to end connectivity, if an Out Side Plant (OSP) connectivity is present in the network of optical fiber cabling arrangement between a plurality of user equipments; publishing a second exception report, said second exception report corresponding to a missing connectivity between an active telecom equipment to Fiber Distribution Panel (FDP); generating a list of participating Fibers in the trace path; and assigning fiber usage and status at fiber level to the list of participating Fibers in the trace path.

In an embodiment, the method may further include a step of storing and updating data corresponding to the logical inventory module based on host name and inventory mapping in 'From site-from equipment-from port' and 'to site-to equipment-to port' format.

Figure 4A:
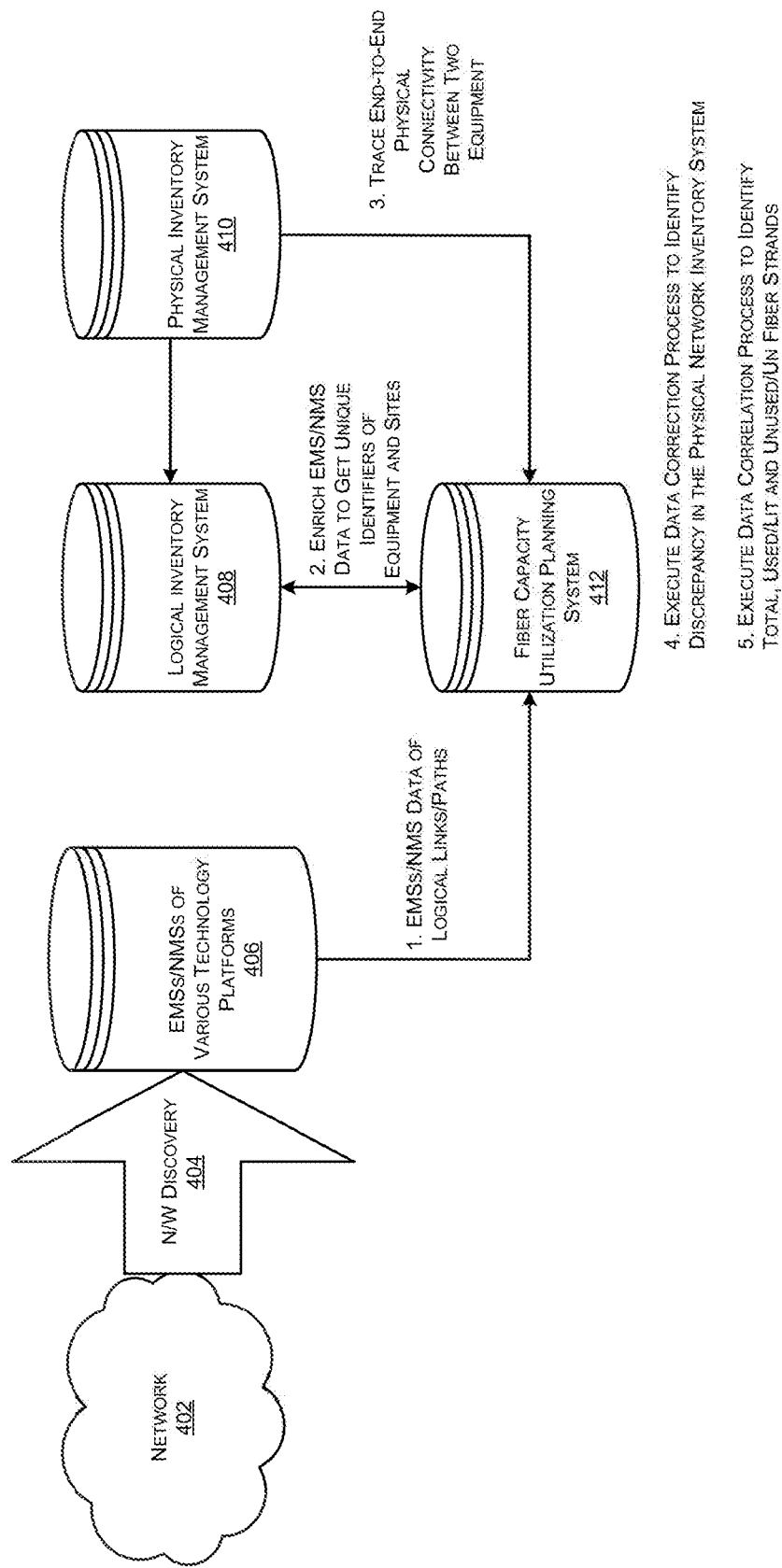
FIG. 4A illustrates solution architecture with high level design for inventory analysis flow in accordance with various aspects of the present disclosure.

FIG. 4A illustrates automated OFC capacity utilization solution architecture pipeline according to primary aspects of the proposed invention. This pipeline is executed on Fiber Capacity Utilization Pipeline System (412) (CUPS 412). Further, the capacity utilization pipeline operates on a management module (406) that may include a collection of Element Management System (EMS)/Network Management System (NMS) samples captured on the logical link paths during a time period T for discovering a network (402). The EMS/NMS (406) may interact with network elements (equipment) in the network and 'discovers' the network information (404). The Logical path/link may provide end-to-end connection between two telecommunication equipment installed at two different sites located apart from each other. The logical path/link rides over the physical cables connected to each other. As shown in the FIG. 2, the first step 1 may map each of the spatial samples of network elements (equipment) to CUPS (412). In the next step 2, the Logical Inventory Management System (408) (LIMS 408) may enrich the EMS/NMS data to get unique identifiers of equipment and sites. LIMS is an application for management of logical network inventory such as IP address. VLAN ids, bandwidth, traffic channels etc. The logical inventory is built on the physical network inventory through the Inventory adaptor. In the next step 3, trace end-to-end physical connectivity between two equipment frim the Physical Inventory Management System (410) (PIMS 410)). PIMS is a map-based (Geographical Information System based) application for management of physical inventory/assets in the network i.e. sites, equipment, ducts, cables, splices, chambers etc. In the step 4, execute the data correlation process to identify discrepancy in the physical network inventory system. In the step 5, execute data correlation process to identify total, used/lit and unused/un-lit fiber strands.

In one of the embodiments, the CUPS (412) may provide end-to-end physical connectivity trace. The CUPS Custom engine may be developed to use the 'Commissioned'/'In service' network links discovered by EMS/NMS and validate the data in the systems of records—Logical network inventory management system and GIS-based physical network inventory management system. The data is read through an adaptor from the EMS/NMS systems. The CUPS identifies the 'Commissioned'/'In Service' equipment in the network and checks the inventory accuracy in the systems of records. If any mismatch is identified between the real world (network) and the systems of records, then an inventory data correction task will be triggered by CUPS for rectification. The rectification is done in the as-built inventory systems of records i.e. Logical network inventory management system and GIS-based physical network inventory management system. The adapter ensures that the inventory data is available and correct across all the systems and ensures the correct end-to-end connectivity record is available between the equipment-ports matching with the data discovered by the EMS/NMS systems. The end-to-end connectivity record includes the port on the active telecom equipment, passive frames like fiber distributing panels (FDP) and the optical fiber cables connected using splice closures/cable joints.

Figure 4B:
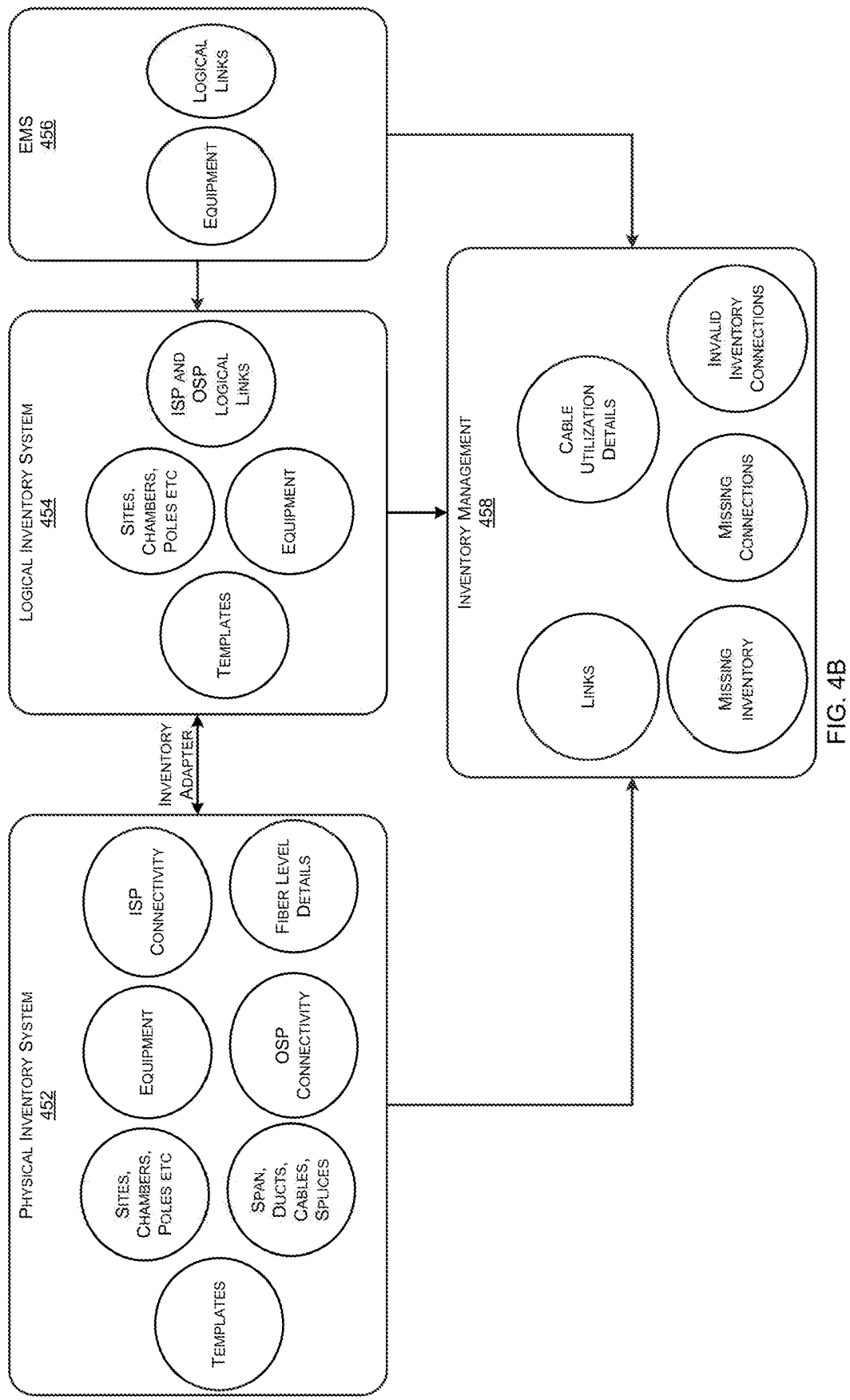
FIG. 4B illustrates solution architecture with high level inventory flow in accordance with an embodiment of the present disclosure.

In another embodiment, the Fiber strand usage may be calculated by the CUPS (412) which derives the lit (used) and un-lit (unused) fibers in each optical fiber cable. This system reads the links processed by the 'trace inventory adapter' and finds how the logical network links are riding in each cable and based on the link type it distributes the usage in each cable based on the cable participation in each link. The final output of CUPS is total number of fiber strands in a cable, number of utilized/lit fiber strands and number of unutilized/un-lit fiber strands available for leasing out between any two locations on the OFC network. FIG. 4B illustrates various sub-systems/modules of the automated OFC capacity utilization solution architecture pipeline in accordance with various aspects of the invention. Physical inventory Management System (412)—It is a map-based (Geographical Information System-based) application for management of physical inventory/assets in the network i.e. sites, equipment, ducts, cables, splices, chambers etc.

Logical inventory management system (414)—It is an application for management of logical network inventory such as IP address, VLAN ids, bandwidth, traffic channels etc. The logical inventory is built on the physical network inventory. EMS/NMS (416)—Element Management System/Network Management System interacts with network elements (equipment) in the network and 'discovers' the network information.

Logical path/link—End-to-end connection between two telecommunication equipment installed at two different sites located apart from each other. The logical path/link rides over the physical cables connected to each other.

Database which could be implemented by any of popular Databases, such as Oracle. PostgreSQL, and the like.

Storage module could be implemented by any of storage framework including the Hadoop Distributed File System (HDFS). HDFS can store large amount of data across distributed machines in reliable and efficient way.

CUPS Pipeline Executor could be implemented by a monolithic software application or it could be implemented by a series of coordinated microservices, with each microservice targeting a specific part of the pipeline execution. Further, the pipeline executor could be implemented by a series of coordinated Apache Spark applications, with each of application targeting a specific part of the pipeline execution. Implantation using Spark Jobs is desirable to execute planning requests where hundreds of millions of spatial samples need to work on by the pipeline executor with the CPU and RAM for the planning server to enable the execution of various modules of the planning server.

All the above sub-system is connected to the Inventory Management System (418) or CUPS to provide the solution in accordance with various use cases as defined below.

Figure 5:
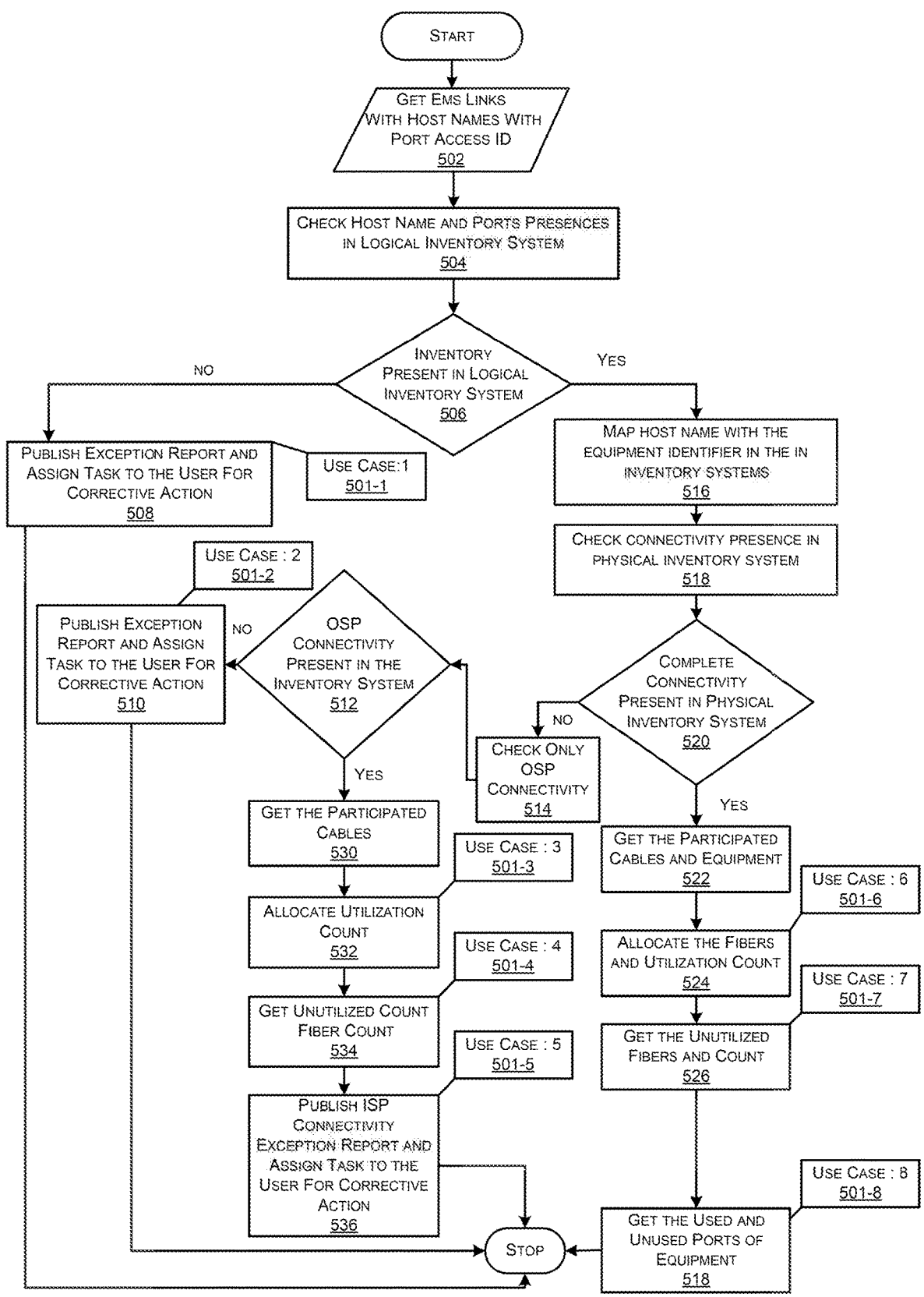
FIG. 5 illustrates an exemplary proposed high level process flow (500) in accordance with an embodiment of the present disclosure.

FIG. 5 illustrates an exemplary proposed high level process flow (500) in accordance with an embodiment of the present disclosure.

The High-Level Process flow may include at block 502, the EMS/NMS systems provide the logical paths/links between two equipment with port details along with host name of the equipment and identifier of the port and at block 504 enrich the EMS/NMS links data based on host name and inventory mapping in logical network inventory management system. At block 506, the availability of links inventory data in 'From site-from equipment-from port' and 'to site-to equipment-to port' format may be checked. The CUPS may check availability of end-to-end connectivity in GIS-based physical network inventory management system.

If end-to-end ('from-equipment-port' to 'to-equipment-port') connectivity is not present in the physical network inventory management system, then CUPS to generate exception report at block 508.

Using equipment inventory identifier, trace the connectivity in the physical inventory system at block 516 and check whether end-to-end connectivity is present as per the logical links or not at block 518. If complete inventory is not present in physical connectivity system at block 520, then cheek only for Out Side Plant (OSP) connectivity at block 514.

If the OSP connectivity is present in the physical inventory system between the equipment of 'A' and 'Z' site at block 512, then get the participated cables in the trace path at block 530 and assign fiber usage in CUPS at block 532 and get the unutilized fiber counts at block 534. Publish exception report of missing In Side Plant (ISP) connectivity i.e. connectivity between active telecom equipment to Fiber Distribution Panel (FDP) at block 536

If the OSP connectivity is not present in the physical inventory system at block 512, then then generate exception report and assign task to the user to take corrective action at block 510.

If the end-to-end link is available in the physical inventory system at block 520, get the list of participating Fiber by CUPS at block 522 in the trace path and assign the fiber usage as well as the status at fiber level by CUPS at block 524, get the unutilized fiber counts at block 526 and get the used and unused ports of the equipment at block 528.

Figure 6:
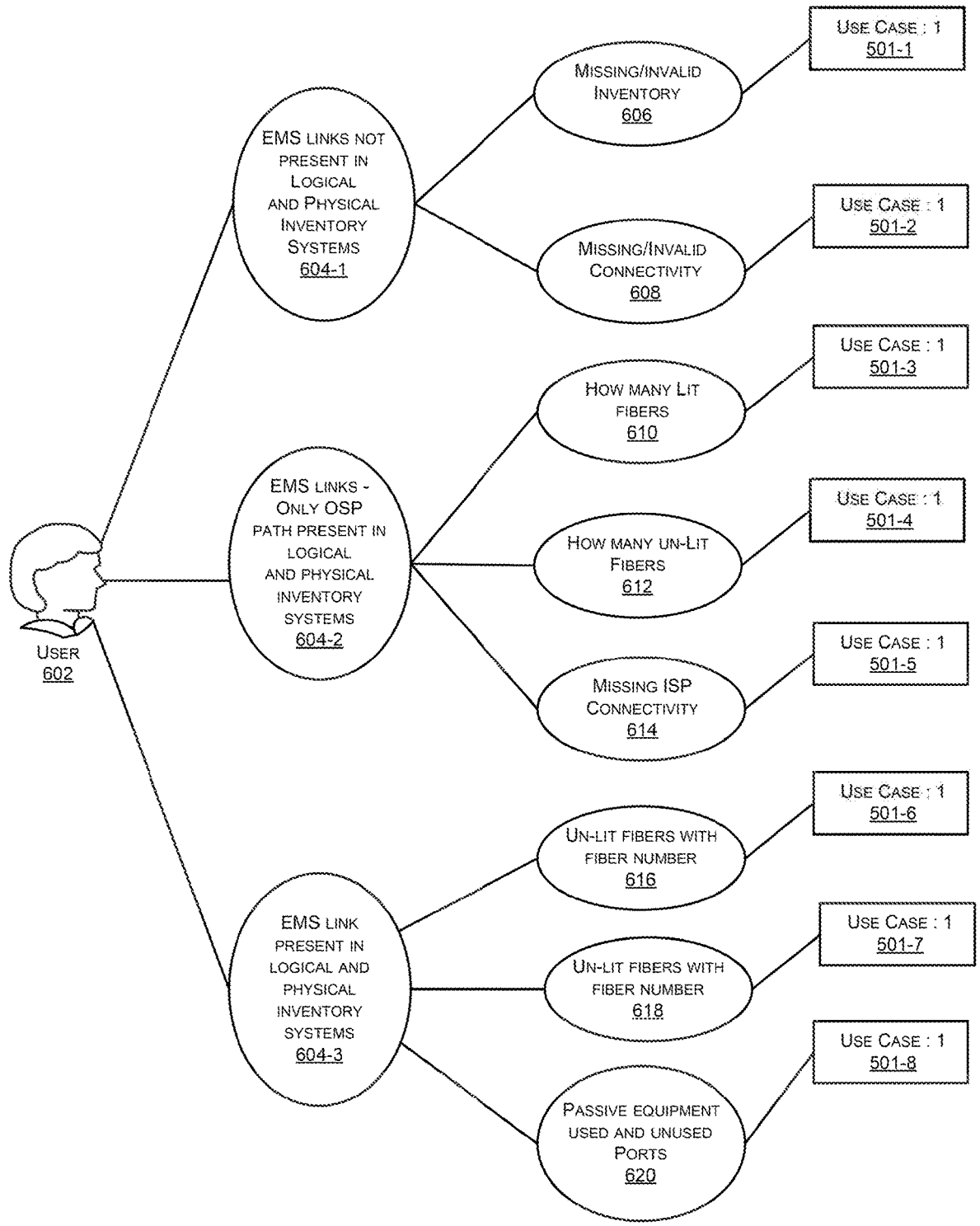
FIG. 6 illustrates an exemplary proposed different use cases in accordance with an embodiment of the present disclosure.

FIG. 6 illustrates an exemplary proposed different use cases in accordance with an embodiment of the present disclosure.

As illustrated, in an aspect, a user (602) may encounter at least three possibilities such as EMS link not present in logical and physical inventory systems (604-1), EMS link-only OSP path in logical and physical inventory systems (604-2) and EMS link present in logical and physical inventory systems (604-3).

The EMS link not present in logical and physical inventory systems (604-1) may be due to any or a combination of missing/invalid inventory (use case 1 (501-1)) and missing invalid connectivity (608)(use case 2 (501-2)).

The EMS link-only OSP path in logical and physical inventory systems (604-2) may lead to any or a combination of how many lit fibers (610) (use case 3 (501-3)), how many unlit fibers (612) (use case 4 (5014)) and missing ISP connectivity (614) (use case 5 (501-5)).

The EMS link present in logical and physical inventory systems (604-3) may lead to any or a combination of lit fibers along with fiber numbers (616) (use case 6 (501-6)), unlit fibers with fiber number (618) (use case (50-7) and passive equipment used and unused pots (614) (use case (501-8)).

In another embodiment, various use cases implemented by CUPS is provided in the Table 1 below as following.

TABLE 1

Use cases implementation by CUPS

| Use Case Number | Description |
| --- | --- |
| Use Case: 1 (501-1) | Based on the hostname, provide the list of equipment that are not present in the systems. |
| Use Case: 2 (501-2) | Based on the EMS links, check the connectivity between the |

TABLE 1-continued

Use cases implementation by CUPS

| Use Case Number | Description |
|---|---|
| | equipment as per the EMS links and generate the missing connectivity report. |
| Use Case: 3 (501-3) | If the ISP connectivity not established, then provide the list of the used fibers count in each route. |
| Use Case: 4 (501-4) | If the ISP connectivity not established, then provide the list of the unused fibers count in each route. |
| Use Case: 5 (501-5) | If the ISP connectivity not established, then provide the list of equipment for which ISP connectivity not maninained in the inventory systems. |
| Use Case: 6 (501-6) | Provide list of used fibers and fiber number details in each route. |
| Use Case: 7 (501-7) | Provide list of used fibers and fiber number details in each route. |
| Use Case: 8 (501-8) | Provide list of used passive equipment and respective equipment's used and unused ports in each site. |

FIG. 7 to 14 illustrates various high-level processes of different use came implementation respectively by CUPS for the automated OFC capacity utilization solution in accordance with various aspects of the invention.

Figure 7:
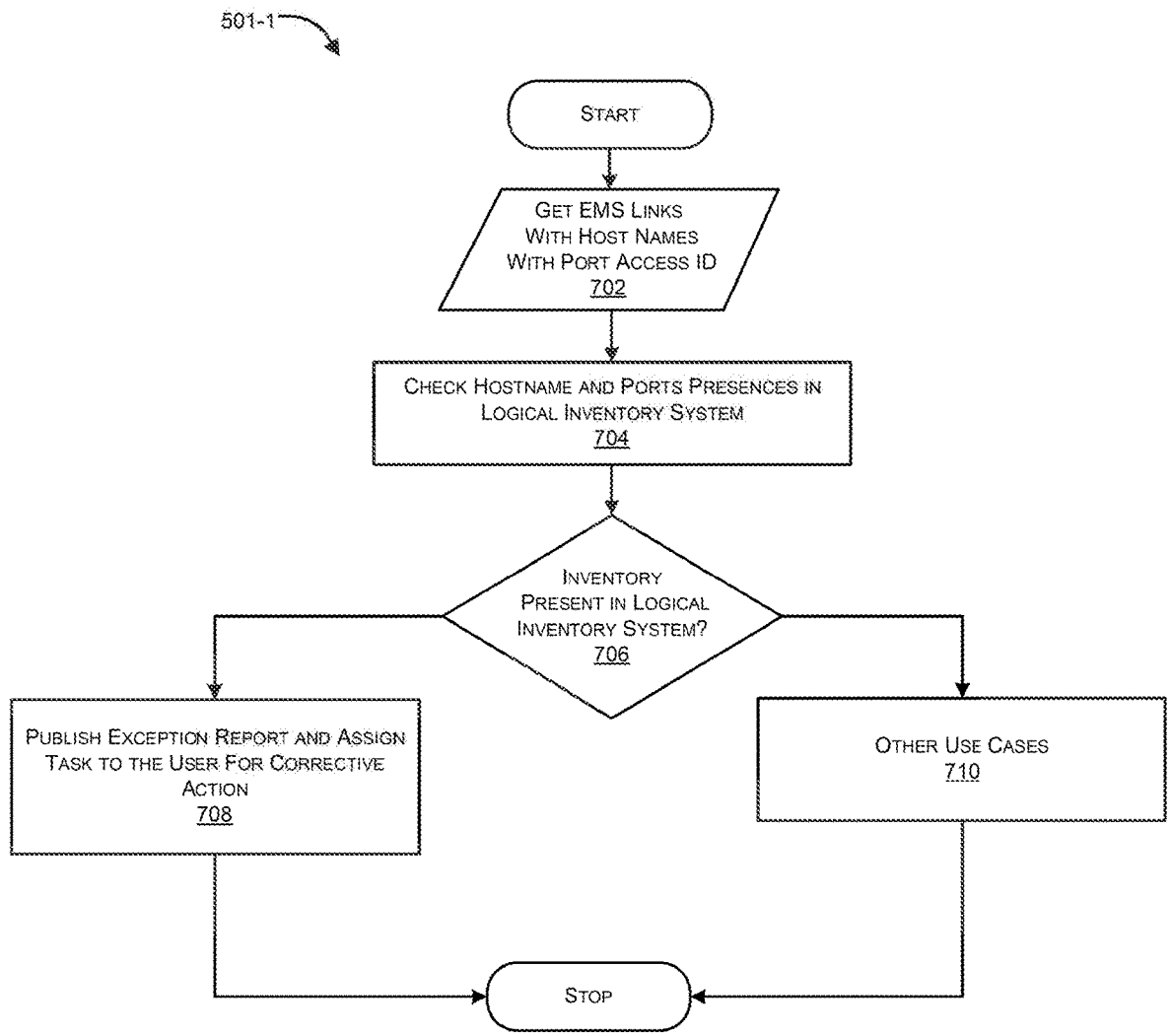
FIG. 7 illustrates an exemplary proposed Use Case 1: Missing and Invalid inventory Flow Diagram in accordance with an embodiment of the present disclosure.

Use Case 1 (501-1) Implemented in FIG. 7:

| Use case | Missing and Invalid Inventory |
|---|---|
| Category usage Process Steps | Physical inventory data quality improvement 1. Get the logical links data from EMS/NMS systems (702) 2. Check the presence of equipment in the logical inventory system based on the hostname of the equipment in the link (704). 3. Check the presence of the equipment at both ends in the logical inventory systems (706). 4. If any equipment participating in the link is not present in the logical inventory system, then publish the exception report in CUPS (708). |

Figure 8:
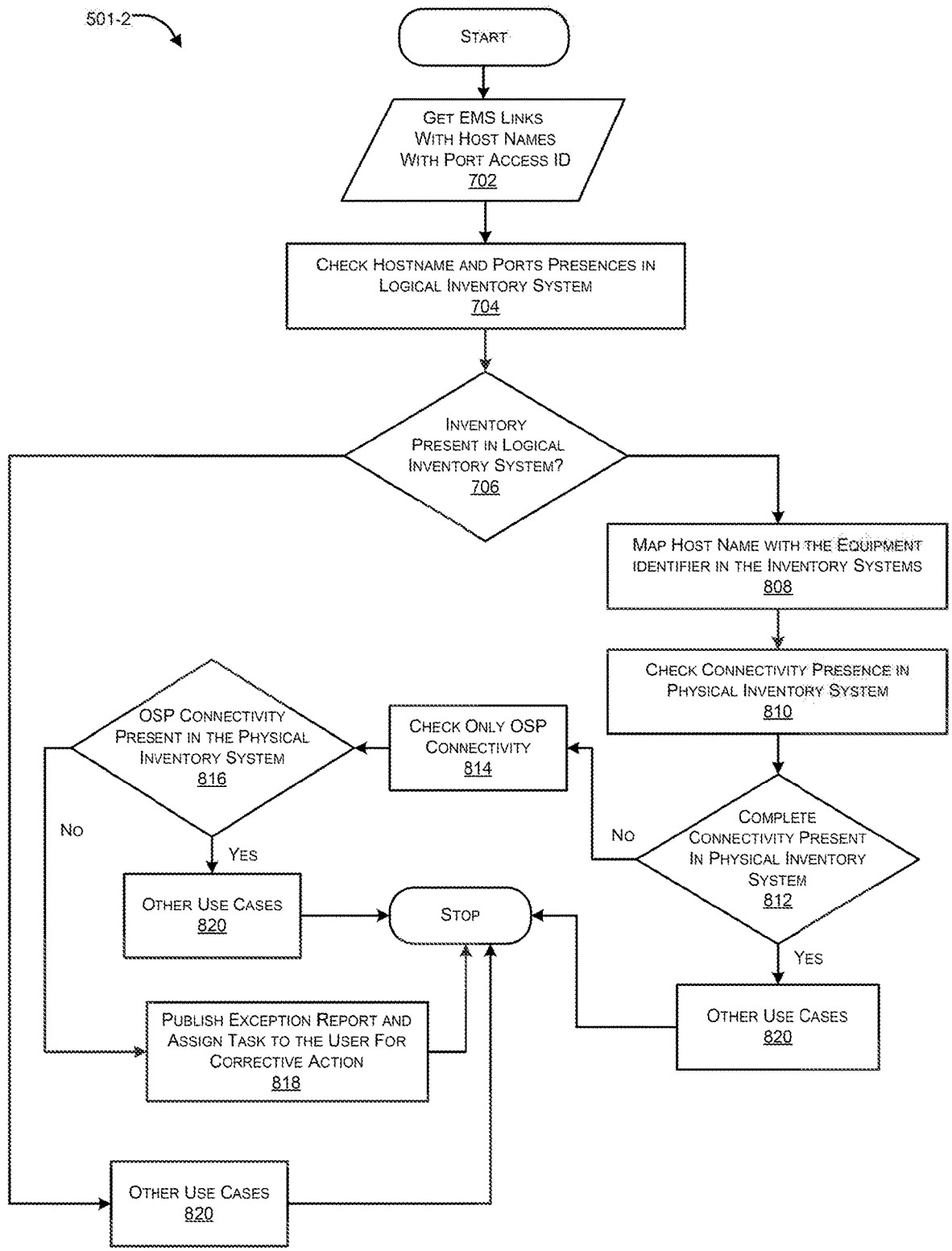
FIG. 8 illustrates an exemplary proposed Use Case 2: Missing and Invalid Connectivity in accordance with an embodiment of the present disclosure.

Use Case 2 Implemented in FIG. 8:

| Use case | Missing and Invalid Connectivity |
|---|---|
| Category usage Process Steps | Physical inventory data quality improvement 1. Get the logical links data from EMS/NMS systems (702) 2. Check the presence of equipment in the logical inventory system based on the hostname of the equipment in the link (704). 3. Check the presence of the equipment at both ends in the logical inventory systems (706). 4. Get the unique identifier of the equipment in the logical and physical inventory systems (808). 5. Get the unique identifier of the site based on the equipment identifier (810). 6. Get the FDP equipment from physical inventory system (812). 7. Check the link presence (IPMPLS, Transport, FMS) from the logical and physical inventory systems (816). 8. If the link is not present, then publish the exception report in CUPS (818). |

Figure 9:
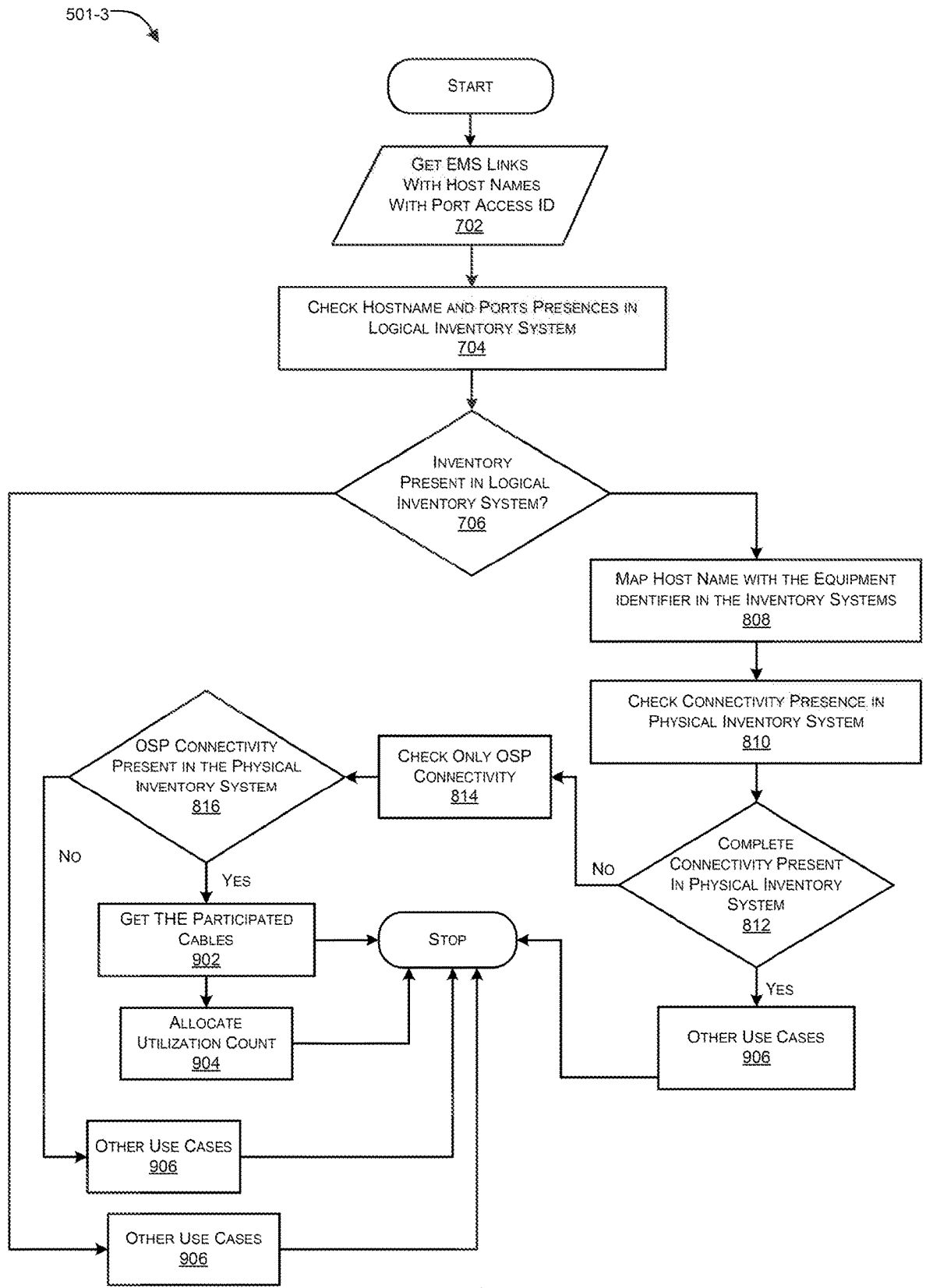
FIG. 9 illustrates an exemplary proposed Use Case 3: How Many Lit Fibers in accordance with an embodiment of the present disclosure.

Use Case 3 Implemented in FIG. 9:

| Use case | How many lit fibers |
|---|---|
| Category Process Steps | Physical inventory data quality improvement 1. Get the logical links data from EMS/NMS systems (702). 2. Cheek the presence of equipment in the logical inventory system based on the hostname of the equipment in the link (704), 3. Check the presence of the equipment at both ends in the logical inventory system (706). 4. Get the unique identifier of the equipment in the logical and physical inventory system (808). 5. Get the unique identifier of the site based on the equipment ideinifter (810). 6. Get the FDP equipment from physical inventory system (812). 7. Check the link presence (IPMPLS, Transport, FMS) in the logical inventory system (814). 8. Check the end-to-end physical connectivity in physical inventory sytems by tracing the cable path between the equipment installed in the two sites (818). 9. Get the fiber strands capacity in each ctthe (902). 10. If only OSP part of the link i.e.: FDP and FDP connectivity between two sites is present in the physical inventory system, then update the capacity and number of utilized fibers against each cable participating in the link and in CUPS (906). |

Figure 10:
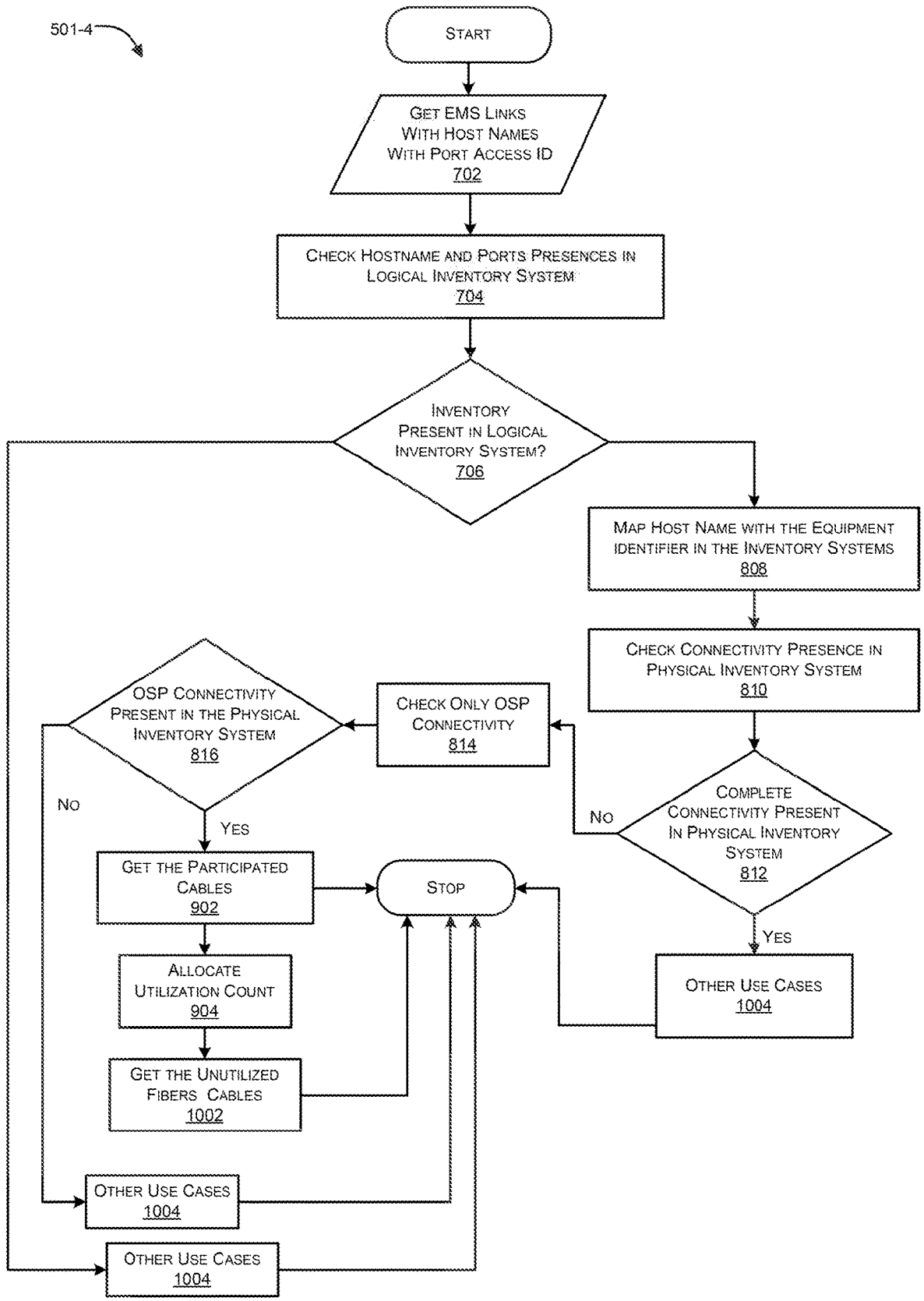
FIG. 10 illustrates an exemplary proposed Use Case 4: How Many Un-Lit Fibers in accordance with an embodiment of the present disclosure.
Figure 11:
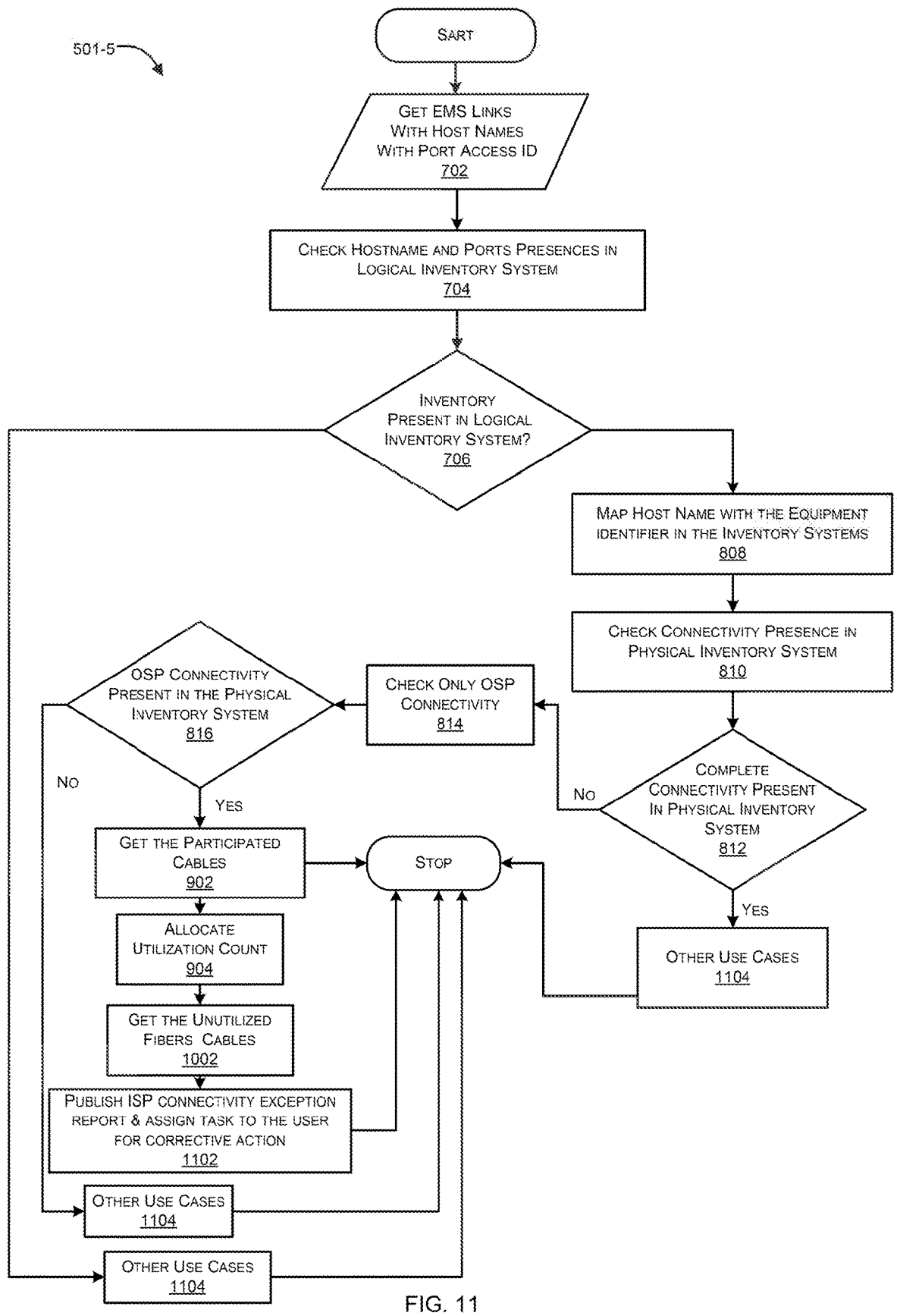
FIG. 11 illustrates an exemplary proposed Use Case 5: Missing ISP Connectivity in accordance with an embodiment of the present disclosure.

Use Case 4 Implemented in FIG. 10:

| Use case | How many un-lit fibers |
|---|---|
| Category Process Steps | Physical inventory data quality improvement 1. Get the logical links data from EMS/NMS systems (702). 2. Check the presence of equipment in the logical inventory system based on the hostname of the equipment in the link (704). 3. Check the presence of the equipment at both ends in the logical inventory system (706). 4. Get the unique identifier of the equipment in the logical and physical inventory systems (808). 5. Get the unique identifier of the site based on the equipment identifier (810). 6. Get the FDP equipment from physical inventory system (812). 7. Check the link presence (IP/MPLS, Transport, FMS) in the logical inventory system (814). 8. Check the end-to-end physical connectivity in physical inventory systems by tracing the cable path between the equipment installed in the two sites (818). 9. Get the fiber strands capacity in each cable (902). 10. If only OSP part of the link i.e.: FDP to FDP connectivity between two sites is present in the physical inventory system, then update the capacity and number of utilized fibers against each cable participating in the link and in CUPS (906). 11. Based on the capacity and lit fibers count in the cable get the un-lit fibers count and publish in CUPS (1002). |

Use Case 5 Implemented in FIG. 1I:

| Use case | Missing ISP Connectivity |
|---|---|
| Category Process Steps | Physical inventory data quality improvement 1. Get the logical links data from EMS/NMS systems (702). 2. Check the presence of equipment in the logical inventory system based on the hostname of the |

| Use case | Missing ISP Connectivity |
|---|---|
| | equipment in the link (704).<br>3. Check the presence of the equipment at both ends in the logical inventory system (706).<br>4. Get the unique identifier of the equipment in the logical and physical inventory systems (808).<br>5. Get the unique identifier of the site based on the equipment identifier (810).<br>6. Get the FDP equipment from physical inventory system (812).<br>7. Check the link presence (IP/MPLS, Transport, FMS) in the logical inventory system (814).<br>8. Check the end-to-end physical connectivity in physical inventory systems by tracing the cable path between the equipment installed in the two sites (818).<br>9. Get the fiber strands capacity in each cable (902).<br>10. If only OSP part of the link i.e.: FDP to FDP connectivity between two sites is present in the physical inventory system, then publish in CUPS (904, 1002), the missing ISP connectivity at each capacity and number of utilized fibers against each end of the link i.e. In Side Plant connectivity between FDP to active equipment (1102). |

Figure 12:
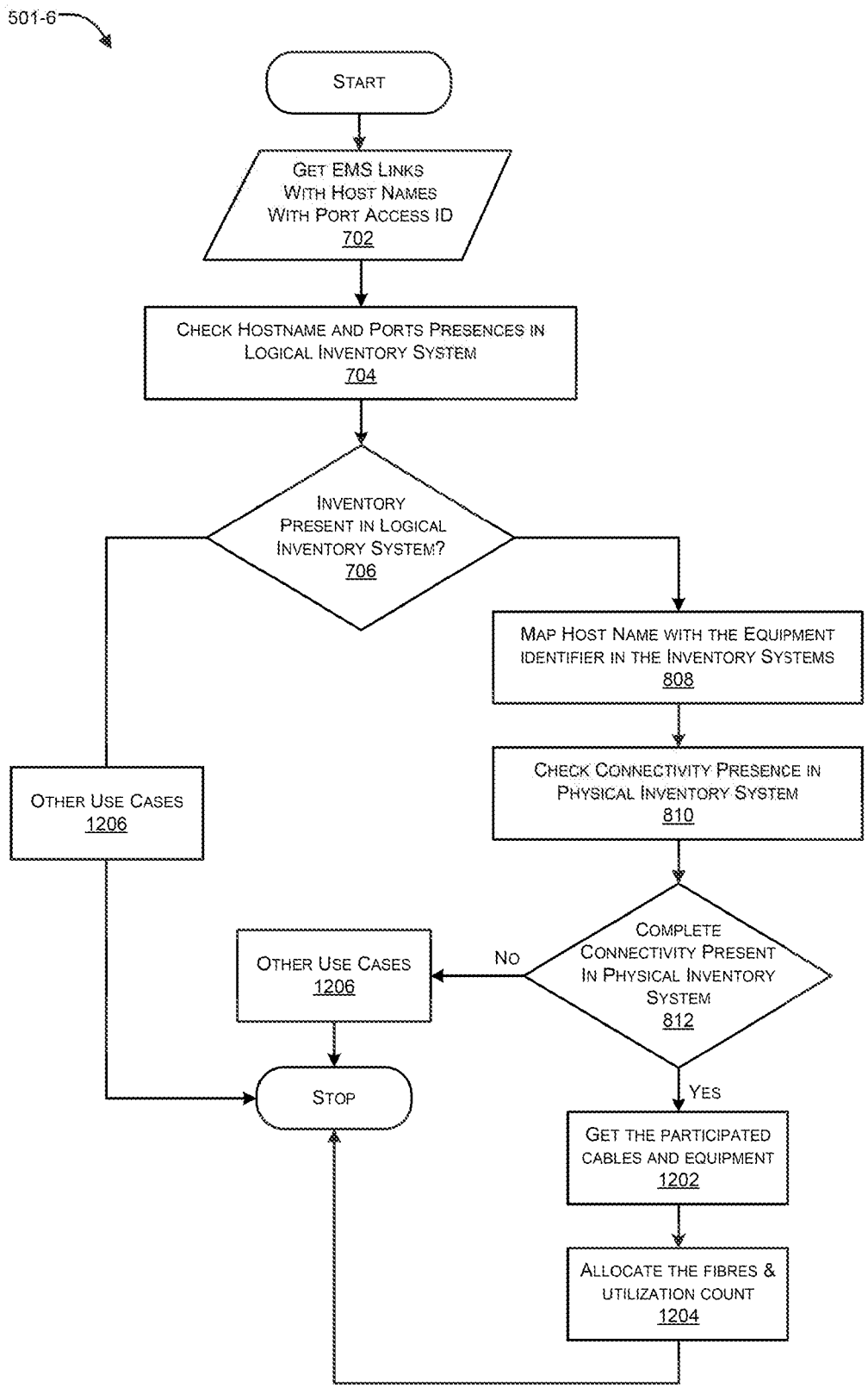
FIG. 12 illustrates an exemplary proposed Use case 6: Lit Fibers with Fiber Numbers in accordance with an embodiment of the present disclosure.

Use Case 6 Implemented in FIG. 12:

| Use case | Lit Fibers with Fiber Numbers |
|---|---|
| Category<br>Process Steps | Identification of fiber capacity available for leasing out<br>1. Get the logical links data from EMS/NMS systems (702).<br>2. Check the presence of equipment in the logical inventory system based on the hostname of the equipment in the link (704).<br>3. Check the presence of the equipment at both ends in the logical inventory system (706).<br>4. Get the unique identifier of the equipment in the logical and physical inventory systems (808).<br>5. Get the unique identifier of the site based on the equipment identifier (810).<br>6. Get the FDP equipment from physical inventory system (812).<br>7. Check the link presence (IPMPLS, Transport, FMS) in the logical inventory system (814).<br>8. Check the end-to-end physical connectivity in physical inventory systems by tracing the cable path between the equipment installed in the two sites (818).<br>9. Get the fiber strands capacity in each cable (1202).<br>10. If the complete link i.e. A-End Active Equipment to A-End FDP, A-End FDP to Z-end FDP and Z-End FDP to Z-End active equipment connectivity is present, then update in CUPS the capacity, number of utilized fibers and lit/used fibers against each cable participating in the link (1204). |

Figure 13:
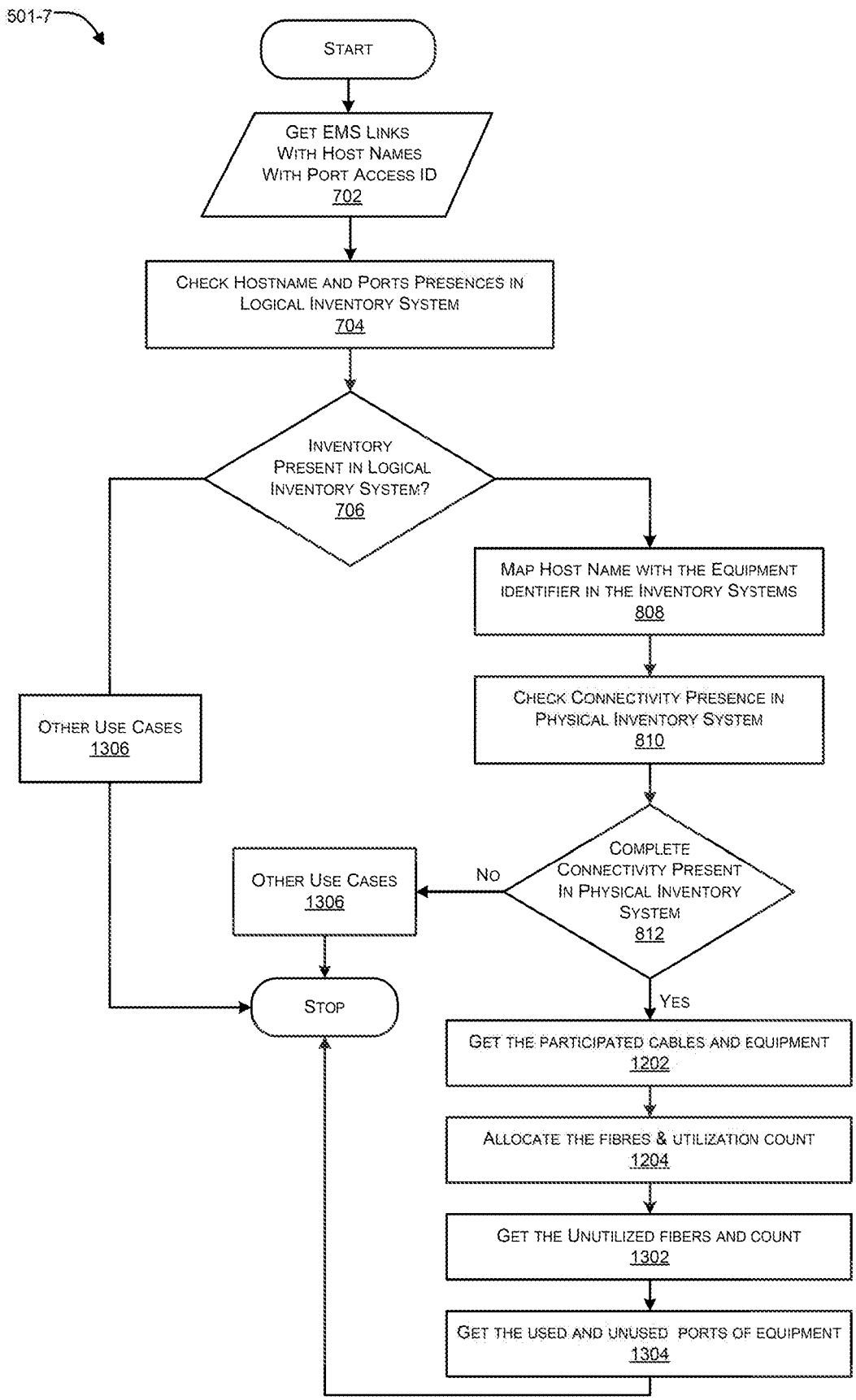
FIG. 13 illustrates an exemplary proposed Use case 7: Un-Lit Fibers with Fiber Numbers in accordance with an embodiment of the present disclosure.

Use Case 7 Implemented in FIG. 13:

| Use case | Un-Lit Fibers with Fiber Numbers |
|---|---|
| Category<br>Process Steps | Identification of fiber capacity available for leasing out<br>1. Get the logical links data from EMS/NMS systems (702).<br>2. Check the presence of equipment in the logical inventory system based on the hostname of the equipment in the link (704).<br>3. Check the presence of the equipment at both ends in the logical inventory system (706).<br>4. Get the unique identifier of the equipment in the logical and physical inventory systems (808).<br>5. Get the unique identifier of the site based on the equipment identifier (810).<br>6. Get the FDP equipment from physical inventory |

| Use case | Un-Lit Fibers with Fiber Numbers |
|---|---|
| | system (812).<br>7. Check the link presence (IPMPLS, Transport, FMS) in the logical inventory system (814).<br>8. Check the end-to-end physical connectivity in physical inventory systems by tracing the cable path between the equipment installed in the two sites (818).<br>9. Get the fiber strands capacity in each cable (1202).<br>10. If the complete link i.e. A-End Active Equipment to A-End FDP, A-End FDP to Z-end FDP and Z-End FDP to Z-End active equipment connectivity is present, then CUPS to update the capacity, number of utilized fibers and lit/used fibers against each cable participating in the link (1204).<br>11. Based on the capacity and lit fibers in the cable CUPS get the un-lit fibers count and fiber numbers (1302). |

Figure 14:
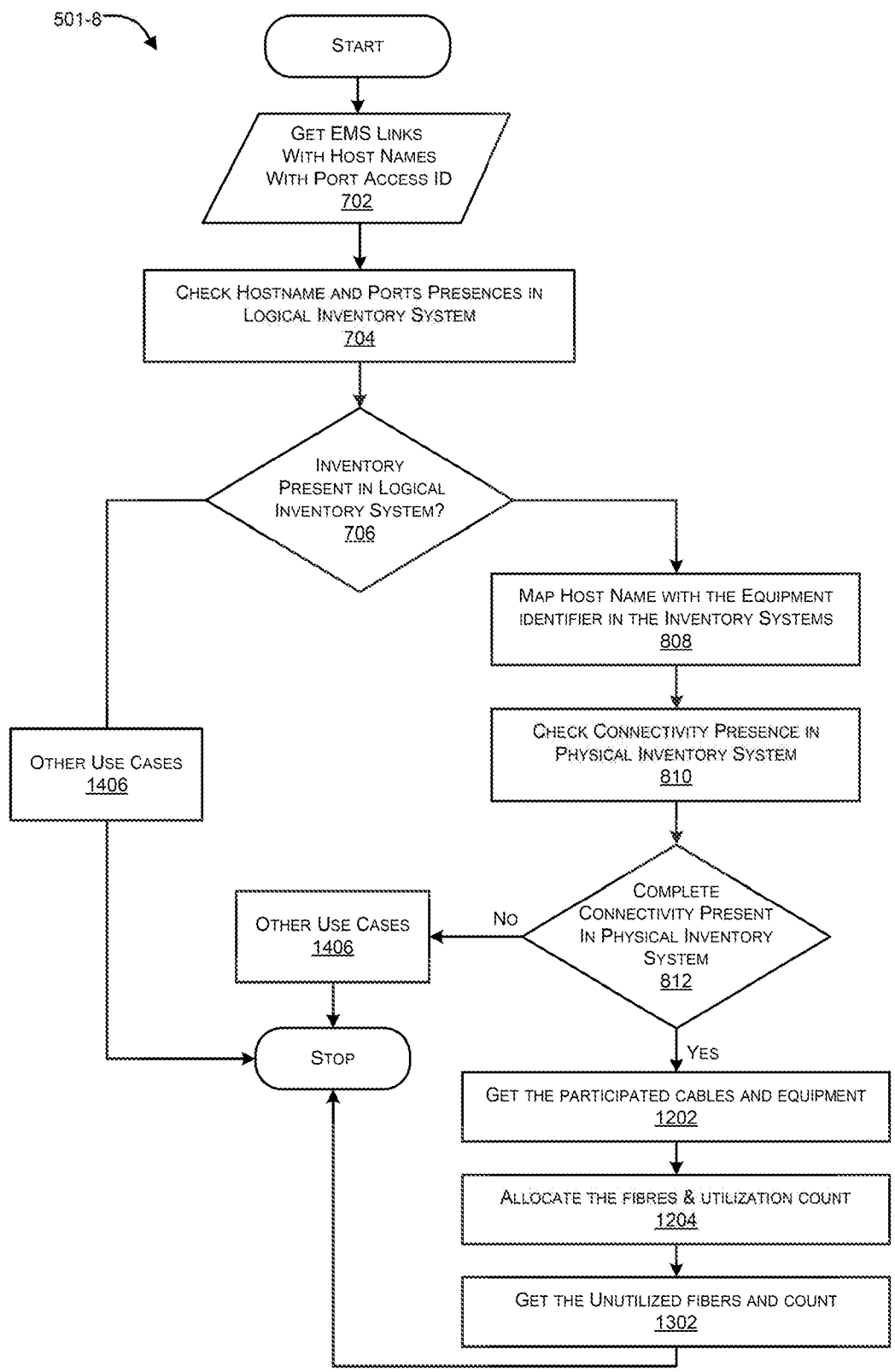
FIG. 14 illustrates an exemplary proposed Use case 8: Used and Unused Passive Equipment's Ports in accordance with an embodiment of the present disclosure.

Use Case 8 Implemented in FIG. 14:

| Use case | Used and Unused Passive Equipment's Ports |
|---|---|
| Category<br>Process Steps | Identification of fiber capacity available for leasing out<br>1. Get the logical links data from EMS/NMS systems (702).<br>2. Check the presence of equipment in the logical inventory system based on the hostname of the equipment in the link (704).<br>3. Check the presence of the equipment at both ends in the logical inventory system (706).<br>4. Get the unique identifier of the equipment in the logical and physical inventory systems (808).<br>5. Get the unique identifier of the site based on the equipment identifier (810).<br>6. Get the FDP equipment from physical inventory system (812).<br>7. Check the link presence (IPMPLS, Transport, FMS) in the logical inventory system (814).<br>8. Check the end-to-end physical connectivity in physical inventory systems by tracing the cable path between the equipment installed in the two sites (818).<br>9. Get the fiber strands capacity in each cable (1202).<br>10. If the complete link i.e. A-End Active Equipment to A-End FDP, A-End FDP to Z-end FDP and Z-End FDP to Z-End active equipment connectivity is present, get the passive ports connected (1204).<br>11. Get the passive equipment participated in the link (1202).<br>12. Get the ports capacity of each passive equipment (1302) |

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

Advantages of the Present Disclosure

The present disclosure provides fora system and method that facilitates an output that is directly usable in establishing the feasibility of customer orders for leasing out the fiber stands/fiber cables in service operator's OFC network.

The present disclosure provides for a system and method that facilitates a schematic representation of the OFC network that depicts used/available fibers between any two locations which is helpful for OSP NOC and OandM.

The present disclosure provides for a system and method that facilitates helping Network Planning and Engineering (NPE) teams to identify the nearest location (site or chamber) to the customer location from where fiber tap-off can be taken.

It is an object of the present disclosure to provide system and method that facilitates rendering on GIS map for spatial analysis in addition to the tabular and schematic representation.

The present disclosure provides for a system and method to minimize, almost eliminate, the need of field survey and site visits for verification and collection of data thereby rendering the cost benefit to the organization.

The present disclosure provides fora system and method that overlays the logical links/paths data to discover by EMSs/NMSs over OFC network to capture in physical inventory management system to identify the used fiber capacity and available/spare fiber capacity between any two locations on OFC network.

The present disclosure provides for a system and method that facilitates the integration of EMS/NMS with physical inventory management system and logical inventory management system to improve the quality of as-built data of physical network which cannot be 'discovered' from the network.

The present disclosure provides for a system and method that facilitates identification of spare fiber capacity with minimal manual intervention thereby eliminating the errors.

The present disclosure provides for a system and method that facilitates implementation in a pipelined manner to ensure reliability and scalability and implemented by independent modules.

The present disclosure provides for a system and method that facilitates Tabular, Schematic and Map view available for depicting route-side fiber capacity (total/used/unused).

The present disclosure provides for a system and method that facilitates no requirement of field survey/site visit for physical verification or data collection.

The present disclosure provides for a system and method that facilitates a planning approach where various option of configuration that are available for Optical fiber solutions with no manual interventions.

The present disclosure provides for a system and method that facilitates a planning approach for both wired, and wireless such as macro and outdoor small cells solution for next generation telecom network.

The present disclosure provides for a system and method that facilitates NPE to assess the feasibility of delivering the customer order for leasing the fibers without any need of site visit/field survey.

We claim:

1. A system facilitating identification of fiber capacity, said system comprising:
   a network of optical fiber cabling arrangement between a plurality of telecom equipments, comprising a multi-fiber optical fiber cable (OFC), wherein each said telecom equipments are connected to a Fiber Distribution Panel (FDP) with a patch cord, said patch cord connecting a port of a router of said telecom equipment to said FDP;
   a management module coupled to a capacity utilization pipeline system (CUPS) module, said management module comprising a processor that executes a set of executable instructions that are stored in a memory, upon execution of which, the processor causes the CUPS module system to:
   discover said network of optical fiber cabling arrangement between an end to end connectivity, said end to end connectivity corresponding to an equipment-port of a first telecom equipment to an equipment-port of a second telecom equipment;
   scan, by a logical inventory module, a logical link path between said end to end connectivity;
   trace by a physical inventory module, an end-to-end physical connectivity between said end to end connectivity;
   identify a set of features of the optical fiber cable (OFC) based on the scanning and tracing of the OFC between said end to end connectivity; and
   determine the fiber capacity of the OPC based on the identification of the set of features, said set of features corresponding to lit, unlit, used and unused fiber strands in the OFC; and
   wherein the CUPS is further configured to:
   generate a first exception report, if the end-to-end connectivity is not present;
   assign fibers for fiber usage determined in a trace path of the end-to-end connectivity, if an Out Side Plant (OSP) connectivity is present in the network of optical fiber cabling arrangement between a plurality of user equipments;
   publish a second exception report, said second exception report corresponding to a missing connectivity between an active telecom equipment to the FDP;
   generate a list of participating fibers in the trace path between the active telecom equipment to the FDP; and
   assign fiber usage and status at fiber level to the list of participating fibers in the trace path between the active telecom equipment to the FDP.

2. The system as claimed in claim 1, wherein a plurality of chambers in the network of optical fiber cabling arrangement comprise a plurality of fiber splice closure, each fiber splice closure comprises one or more splitters connecting a plurality of OFC at a junction.

3. The system as claimed in claim 1, wherein the capacity utilization pipeline module is configured to identify a nearest location to a subscriber location for providing fiber tap-off.

4. The system as claimed in claim 1, wherein geographical information system (GIS) mapping for spatial analysis, tabular and schematic representation for depicting mute-side fiber capacity.

5. The system as claimed in claim 1, wherein the CUPS module system enables verification and collection of data corresponding to fiber capacity.

6. The system as claimed in claim 1, wherein an error correction module eliminates errors during verification and collection of data corresponding to fiber capacity.

7. The system as claimed in claim 1, wherein logical link data discovered by the management module provide the logical paths/links between two equipment with port details along with host name of the equipment and identifier of the port.

8. The system as claimed in claim 1, wherein the CUPS further comprises an equipment inventory identifier, wherein the equipment inventory identifier is configured to:
   determine availability of an end-to-end connectivity in the network of optical fiber cabling arrangement between a plurality of user equipments;
   trace the end-to-end connectivity in the network of optical fiber cabling arrangement between a plurality of user equipments; and determine whether the end-to-end connectivity is present as per predefined logical links.

9. The system as claimed in claim 1, wherein the data corresponding to the logical inventory module is stored and updated based on host name and inventory mapping in 'From site-from equipment-from port' and 'to site-to equipment-to port' format.

10. A method facilitating identification of fiber capacity, said method comprising:
discovering, by a management module coupled to a capacity utilization pipeline system (CUPS) module, a network of optical fiber cabling arrangement between an end to end connectivity, said end to end connectivity corresponding to an equipment-port of a first telecom equipment to an equipment-port of a second telecom equipment;
scanning, by a logical inventory module, a logical link path between said end to end connectivity;
tracing, by a physical inventory module, an end-to-end physical connectivity between said end to end connectivity;
identifying a set of features of an optical fiber cable (OFC) based on the scanning and tracing of the OFC between said end to end connectivity; and
determining the fiber capacity of the OFC based on the identification of the set of feature, said set of features corresponding to lit, unlit, used and unused fiber strands in the OFC; and
wherein the method further comprises:
generating a first exception report, if the end-to-end connectivity is not present;
assigning fibers for fiber usage determined in a trace path of the end-to-end connectivity, if an Out Side Plant (OSP) connectivity is present in the network of optical fiber cabling arrangement between a plurality of user equipments;
publishing a second exception report, said second exception report corresponding to a missing connectivity between an active telecom equipment to a Fiber Distribution Panel (FDP);
generating a list of participating Fibers in the trace path; and
assigning fiber usage and status at fiber level to the list of participating Fibers in the trace path.

11. The method as claimed in claim 10, wherein the method further comprises:
identifying by a capacity utilization pipeline system (CUPS) module a nearest location to a subscriber location for providing fiber tap-off.

12. The method as claimed in claim 11, wherein the method compress:
enabling verification and collection of data corresponding to fiber capacity.

13. The method as claimed in claim 11, wherein the method further comprises:
eliminating by an error correction module, errors during verification and collection of data corresponding to fiber capacity.

14. The method as claimed in claim 10, wherein the method further comprises:
mapping geographical information system (GIS) for spatial analysis, tabular and schematic representation for depicting route-side fiber capacity.

15. The method as claimed in claim 10, wherein the method further comprises:
providing logical links between two equipment with port details along with host name of the equipment and identifier of the port corresponding to logical link data discovered by the management module.

16. The method as claimed in claim 10, wherein the method further comprises:
determining, by an equipment inventory identifier coupled to the CUPS, availability of an end-to-end connectivity in the network of optical fiber cabling arrangement between a plurality of user equipments;
tracing, by the equipment inventory identifier, the end-to-end connectivity in the network of optical fiber cabling arrangement between a plurality of user equipments; and
determining, by an equipment inventory identifier, whether the end-to-end connectivity is present as per predefined logical links.

17. The method as claimed in claim 10, wherein the method further comprises:
storing and updating data corresponding to the logical inventory module based on host name and inventory mapping in 'From site-from equipment-from port' and 'to site-to equipment-to port' format.

* * * * *